US009176525B2

(12) United States Patent
Nakajima

(10) Patent No.: US 9,176,525 B2
(45) Date of Patent: Nov. 3, 2015

(54) ELECTRONIC APPARATUS

(71) Applicant: Kabushiki Kaisha Toshiba, Tokyo (JP)

(72) Inventor: Yuji Nakajima, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 13/692,976

(22) Filed: Dec. 3, 2012

(65) Prior Publication Data
US 2013/0194739 A1 Aug. 1, 2013

(30) Foreign Application Priority Data

Jan. 31, 2012 (JP) .................................. 2012-017983

(51) Int. Cl.
G06F 1/16 (2006.01)

(52) U.S. Cl.
CPC .............. *G06F 1/1616* (2013.01); *G06F 1/162* (2013.01); *G06F 1/1658* (2013.01)

(58) Field of Classification Search
CPC ... G06F 1/1601; G06F 1/1649; G06F 1/1616; G06F 1/1626; G06F 1/1654; G06F 1/1677; G06F 3/011; G06F 3/0202; G06F 1/1605; G06F 1/1607; G06F 1/162; G06F 1/1628; G06F 1/1633; G06F 1/1639; G06F 1/1673; G06F 1/1679; G06F 1/1681; G06F 1/1684; G06F 1/1692; G06F 1/3265; G06F 2200/1612; G06F 3/041; G06F 3/14; G06F 1/1632; G06F 1/1669; G06F 3/0488; G06F 1/1662; G06F 1/1637; G06F 1/26; G06F 3/02; G06F 17/30424; G06F 1/16; G06F 1/1624; G06F 1/1683; G06F 1/189; G06F 1/3206; G06F 2200/1614; G06F 3/012; G06F 3/015; G06F 3/017; G06F 3/0346; G06F 3/0416; G06F 3/044; G06F 3/04817; G06F 3/04842; G06F 3/04845; H05K 5/0204; H05K 5/02; H05K 5/0221; H05K 5/0226; H05K 5/023; H05K 7/16; H05K 7/18

USPC ............ 361/679.27, 679.26, 679.21, 679.09, 361/679.08, 679.02, 679.01, 361/679.55–679.58; 312/223.1–223.2; 248/917–924

See application file for complete search history.

(56) References Cited

U.S. PATENT DOCUMENTS 5,644,469 A * 7/1997 Shioya et al. ............ 361/679.06
5,900,848 A    5/1999 Haneda et al.

(Continued)

FOREIGN PATENT DOCUMENTS

JP  03-132814 A  6/1991
JP  03-278212 A  12/1991

(Continued)

OTHER PUBLICATIONS

First Office Action mailed by Japan Patent Office on Jan. 22, 2013 in the corresponding to Japanese patent application No. 2012-017983 in 5 pages.

Primary Examiner — Anthony Haughton
Assistant Examiner — Ingrid Wright
(74) Attorney, Agent, or Firm — Knobbe, Martens, Olson & Bear, LLP

(57) ABSTRACT

According to one embodiment, an electronic apparatus includes a main body, a display module, a pair of arm portions configured to couple a first axis and a second axis and including an elbow portion at a predetermined point, each of the arm portions being rotatable about the first axis between a first position in which the second axis is positioned in the vicinity of a first end portion and a second position in which the second axis is positioned in the vicinity of a second end portion, and a component provided in the vicinity of a first side surface of the main body in a position bypassed by the elbow portion when the arm portion is in the second position.

15 Claims, 20 Drawing Sheets

(56) References Cited

U.S. PATENT DOCUMENTS

| | | | |
|---|---|---|---|
| 7,158,634 B2 * | 1/2007 | Eromaki | 379/433.13 |
| 7,283,355 B2 | 10/2007 | Han | |
| 2005/0128695 A1 | 6/2005 | Han | |
| 2006/0256512 A1 * | 11/2006 | Esther Kang | 361/681 |
| 2008/0011802 A1 | 1/2008 | Chen et al. | |
| 2008/0125191 A1 | 5/2008 | Nordenskjold | |
| 2012/0275099 A1 | 11/2012 | Yamami et al. | |

FOREIGN PATENT DOCUMENTS

| | | |
|---|---|---|
| JP | 04-333958 A | 11/1992 |
| JP | 05-006243 A | 1/1993 |
| JP | 05-173668 A | 7/1993 |
| JP | 09-305262 A | 11/1997 |
| JP | 2005-174348 A | 6/2005 |
| JP | 2007-534242 A | 11/2007 |
| JP | 2008-533887 A | 8/2008 |
| JP | 2009-218674 A | 9/2009 |
| JP | 3161922 U | 7/2010 |
| JP | 2011-114521 A | 6/2011 |
| WO | WO 2005/104504 A1 | 11/2005 |
| WO | WO 2006/097186 A1 | 9/2006 |

* cited by examiner

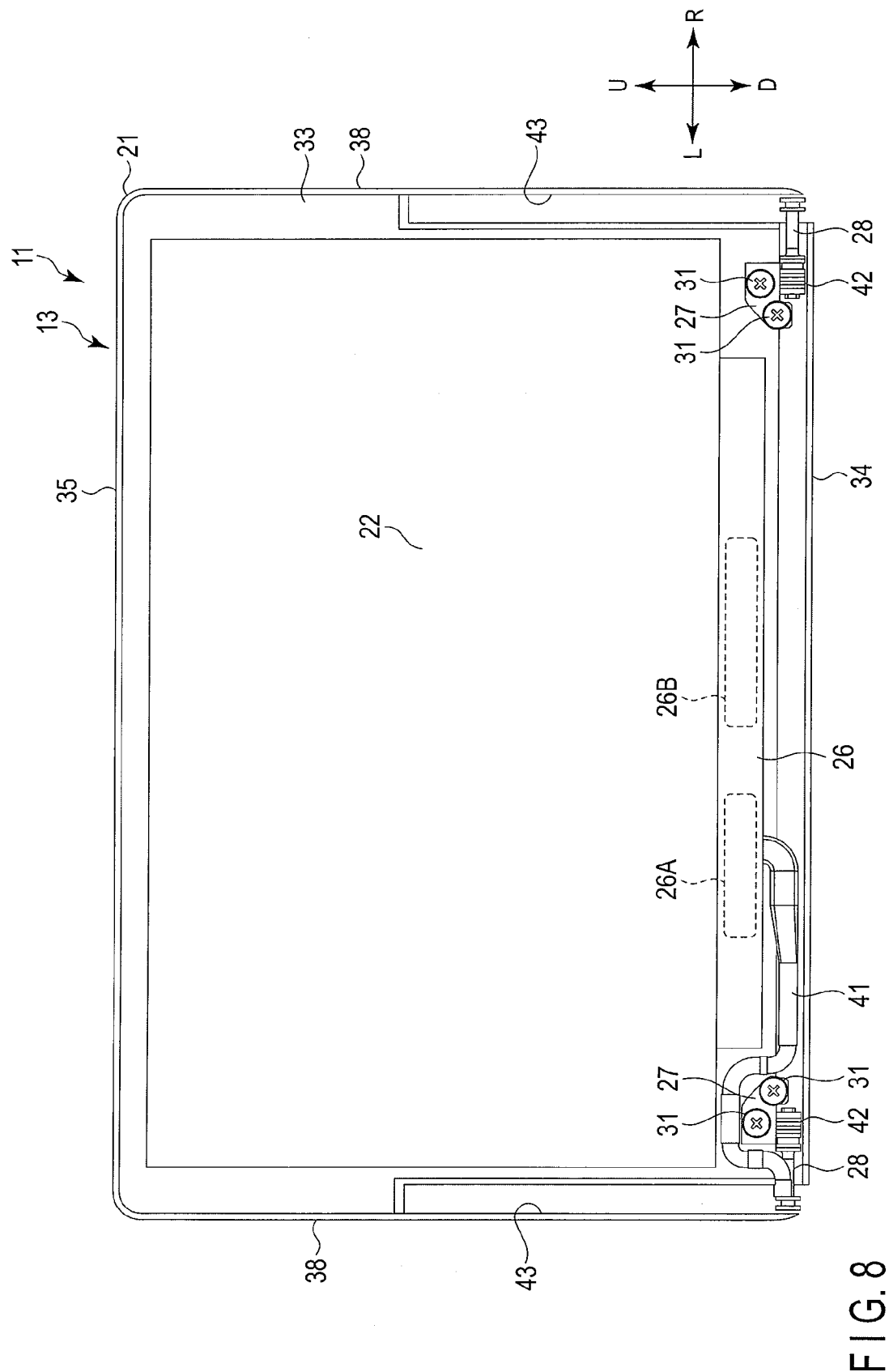
F I G. 8

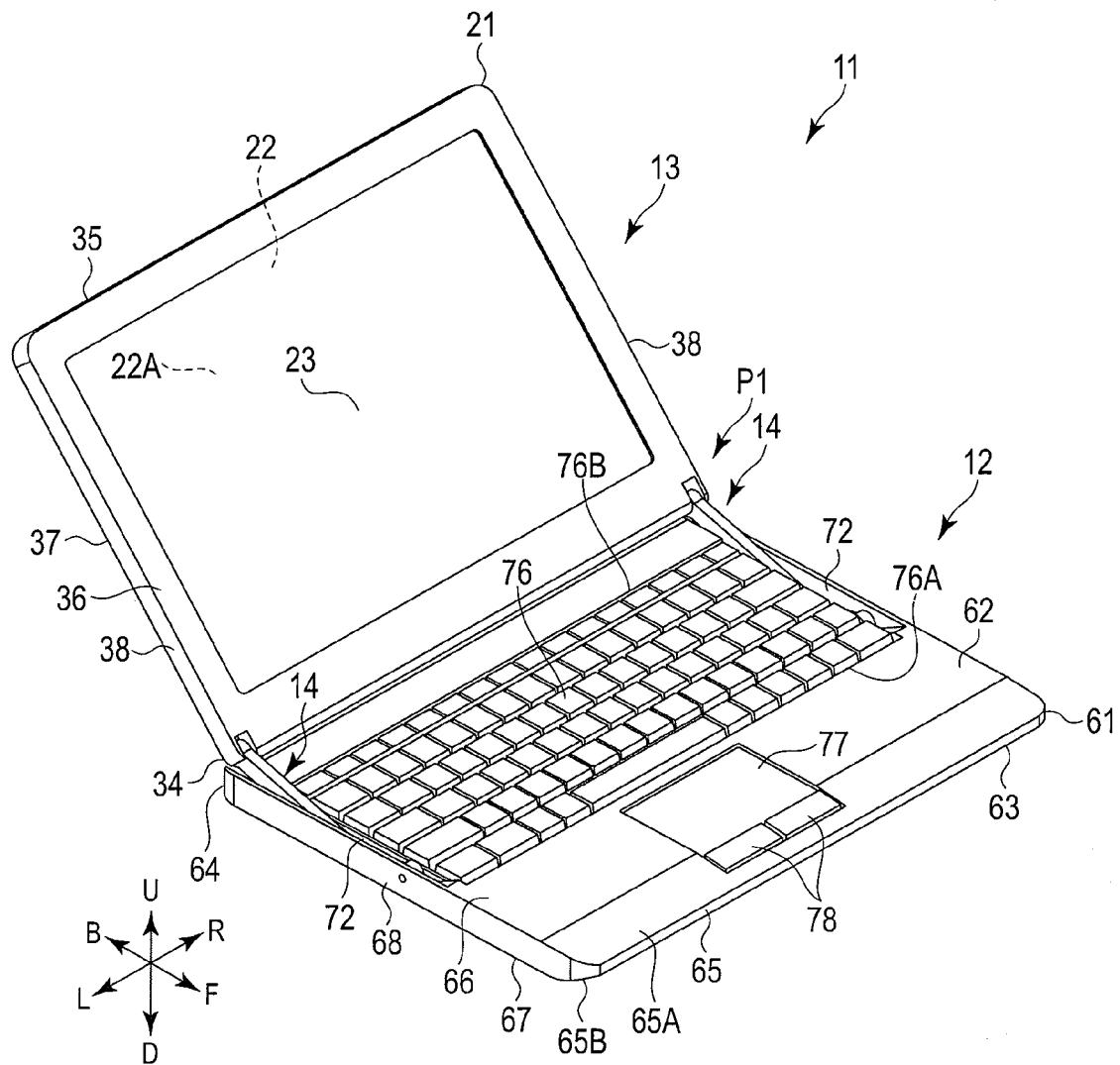
F I G. 12

ELECTRONIC APPARATUS

CROSS-REFERENCE TO RELATED APPLICATIONS

This application is based upon and claims the benefit of priority from prior Japanese Patent Application No. 2012-017983, filed Jan. 31, 2012, the entire contents of which are incorporated herein by reference.

FIELD

Embodiments described herein relate generally to an electronic apparatus comprising a display module.

BACKGROUND

An information processing apparatus in which a main body and a lid are rotatably coupled by a rotating arm has been known.

Nowadays, notebook computers and tablet computers are widely used. It is desired to provide an electronic apparatus in a form that improves user-friendliness.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 8 is an exemplary plane view illustrating an inside of a display module of the portable computer shown in FIG. 1 in a state in which a mask of the display module is removed;

FIG. 12 is an exemplary perspective view of a usual deployed configuration of the portable computer shown in FIG. 11;

DETAILED DESCRIPTION

Figure 1:
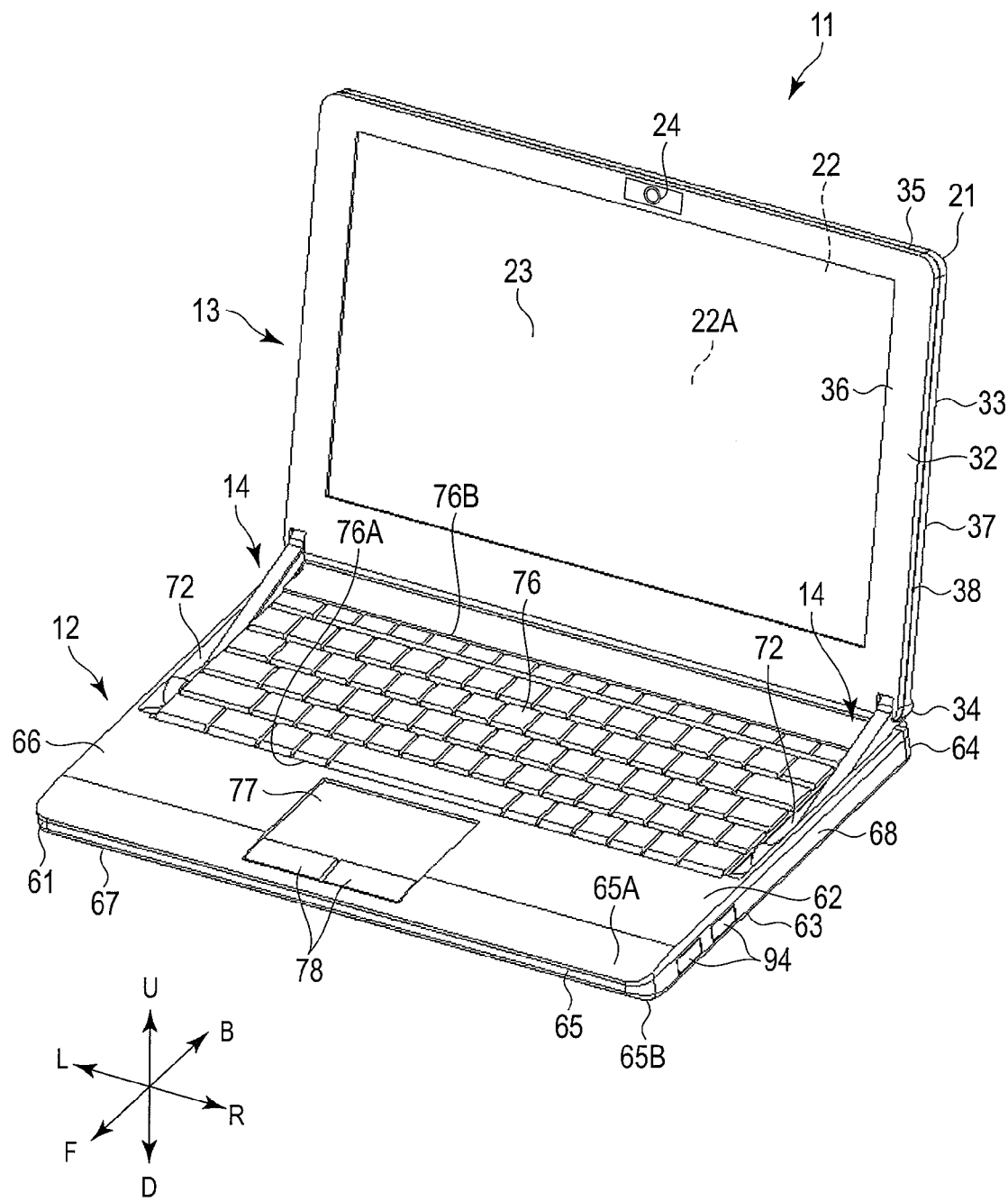
FIG. 1 is an exemplary perspective view illustrating a portable computer, which is an example of an electronic apparatus according to a first embodiment.

Various embodiments will be described hereinafter with reference to the accompanying drawings.

In general, according to one embodiment, an electronic apparatus includes a main body, a display module, a pair of arm portions configured to couple a first axis and a second axis and including an elbow portion at a predetermined point, each of the arm portions being rotatable about the first axis between a first position in which the second axis is positioned in the vicinity of a first end portion and a second position in which the second axis is positioned in the vicinity of a second end portion, and a component provided in the vicinity of a first side surface of the main body in a position bypassed by the elbow portion when the arm portion is in the second position.

Hereinafter, an electronic apparatus according to a first embodiment will be described with reference to FIGS. 1-17. In the embodiments that will be described below, the front side (i.e., the side of the user) is defined as a front direction F, the back side with respect to the user is defined as a back direction B, the left side with respect to the user is defined as a leftward direction L, the right side with respect to the user is defined as a rightward direction R, the upper side with respect to the user is defined as an upward direction U, and the lower side with respect to the user is defined as a downward direction D. The front direction F corresponds to a direction (side) in which a display screen 22A faces, or a direction (side) in which an input surface of a touchpanel 23 faces. The back direction B corresponds to a direction (side) opposite to the direction (side) in which the display screen 22A faces, or a direction (side) opposite to the direction (side) in which the input surface of the touchpanel 23 faces. The rightward direction R corresponds to the right-hand side (direction of the right hand) of the user, a direction (side) in which the user makes an operation with his or her hand, or a direction (side) close to the right hand of the user. The leftward direction L corresponds to the left-hand side (direction of the left hand) of the user, a direction (side) in which the user makes an operation with his or her left hand, or a direction (side) close to the left hand of the user. The upward direction U corresponds to a direction (side) in which the display module 13 is provided, or a direction (side) in which a keyboard of a main body 12 is provided. The downward direction D corresponds to a direction (side) in which the main body is provided, or a direction (side) opposite to the direction (side) in which the keyboard of the main body is provided.

A portable computer 11, which is an example of the electronic apparatus, comprises: a main body (first unit) 12 including a first printed circuit board 83 on which a CPU, for example, designed to collectively control the whole portable computer 11, is mounted; a display module (second unit) 13 including a display screen 22A; and a pair of arm portions 14 which rotatably couples the main body 12 and the display module 13.

Figure 9:
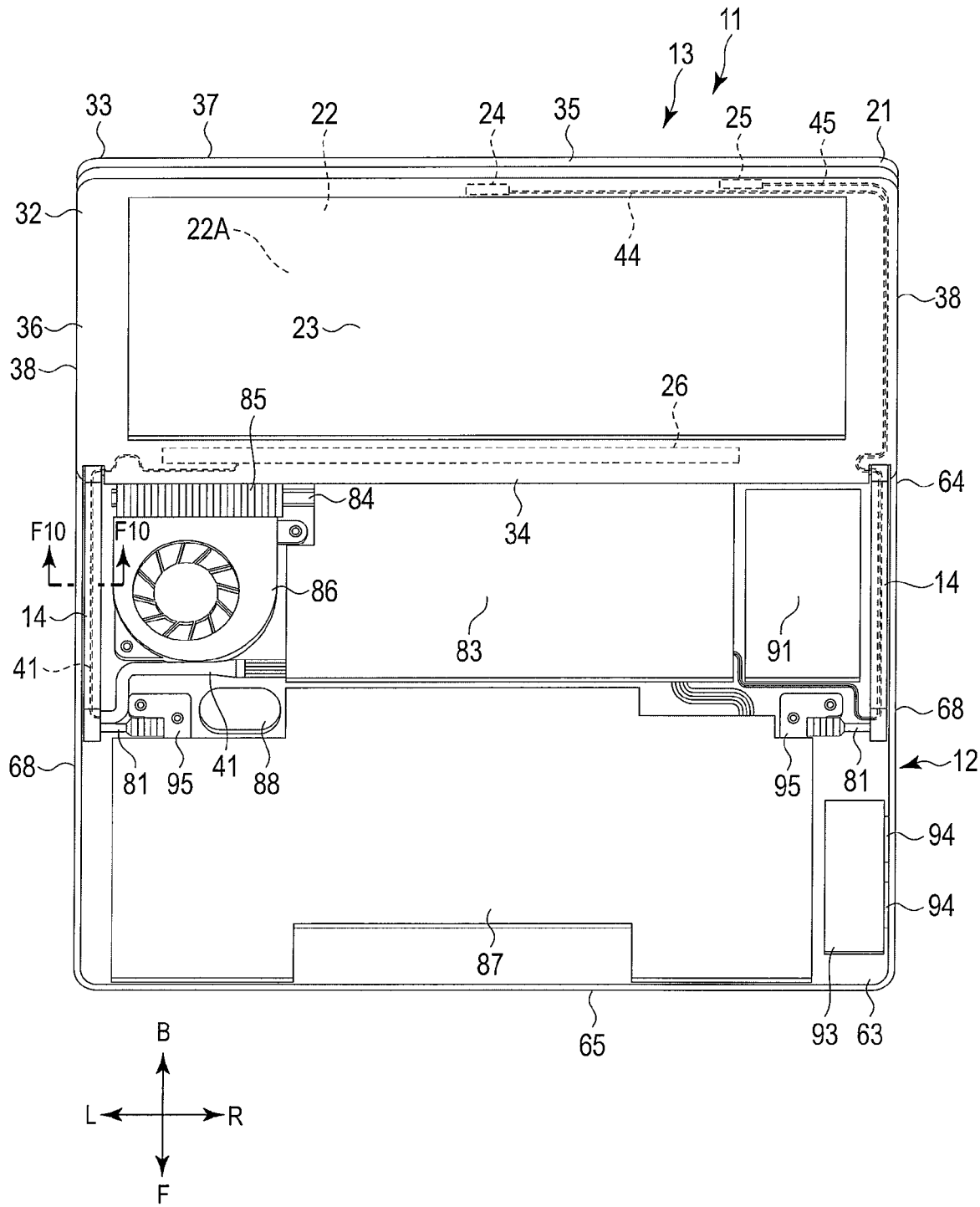
FIG. 9 is an exemplary perspective view illustrating an inside of a main body cabinet of the portable computer shown in FIG. 1 in a state in which a first case is removed.

As shown in FIGS. 1, 8, and 9, the display module 13 includes: a display cabinet 21 (display case; second housing); a display panel (display device, panel) 22 housed in the display cabinet 21 and configured to display an image on the display screen 22A exposed to the outside; a touchpanel 23 (touch sensor; sensor; detector; covering portion) provided closer to the outside than the display panel 22 so as to be exposed to the outside and cover a top surface of the display panel 22; a camera (lens; imaging module; imaging device, electronic component) 24 attached to a portion of the display cabinet 21; an antenna (transmitter; receiver; wireless communication module) 25 provided in the display cabinet 21 at an upper part (an end portion on a side farther from the main body than the display panel 22) of the display cabinet 21; a second printed circuit board 26 provided adjacent to the lower part of the display panel 22 (provided in the vicinity of the display panel 22; arranged next to the display panel 22 in the longitudinal direction); a second metallic part (second supporting portion) 27 provided in the display cabinet 21; a second axis (second rotation center; second supporting member) 28 rotatably supported by the second metallic part 27; a fixing member (screw; engaging portion) 31 configured to fix the second metallic part 27 to a cover 33 of the display cabinet 21; and a second applying portion (second braking module; second resistance unit) 42 configured to apply a torque to the second axis 28. In the present embodiment, the fixing member 31 comprises a screw as an example, but is not limited thereto and may comprise another component or member such as an engaging claw and a hook.

The display cabinet 21 includes a frame-shaped mask (third case) 32 which covers the front direction F of the display panel 22 and the touchpanel 23, and a cover (fourth case) 33 which covers the back direction B of the display panel 22. The display cabinet 21 includes one end portion 34 (an end portion on a side closer to the main body than the display panel 22; one side); the other end portion 35 (an end portion on a side farther from the main body than the display panel 22; the other side) on the side opposite to the end portion 34; a third surface 36 to which the display screen 22A is exposed; a fourth surface 37 opposite to the third surface 36; and a pair of second side surfaces 38 which crosses the third surface 36 and the fourth surface 37 and is continuous with the one end portion 34 and the other end portion 35. A pair of second axes 28 is provided in the vicinity of the one end portion 34 (in a position adjacent to the one end portion 34; along the one end portion 34) so as to extend over the display module 13 and the arm portions (coupling portions; connecting portions) 14.

As shown in FIG. 8, apart of a harness 41 (LCD harness; cable) configured to connect the first printed circuit board 83 of the main body 12 and the second printed circuit board 26 of the display module 13 is provided in the display cabinet 21. The part of the harness 41 runs through the display cabinet 21 from the vicinity of the one end portion 34 (end portion on a side closer to the main body than the display panel 22) of the display cabinet 21, bypasses the second metallic part 27 and the fixing member 31, and is connected to the second printed circuit board 26 in approximately the shortest distance (by extending linearly along the one end portion 34). With this configuration, since excess space does not need to be provided between the display cabinet 21 and the display panel 22 in order to let the harness 41 run therethrough, the display cabinet 21 can be formed in the minimum possible size.

The second printed circuit board 26 is connected to the display panel 22 and the touchpanel 23 via a cable, for example. The second printed circuit board 26 includes, for example, a first circuit portion (circuit member; first control module) 26A designed to control the display panel and a second circuit portion (circuit member; second control module) 26B designed to control the touchpanel. The second applying portion 42 applies a torque (resistance) to the second axis 28 in order to prevent the second axis 28 from rotating about the display module 13, thereby holding and fixing the display module 13 at an arbitrary angle.

Figure 2:
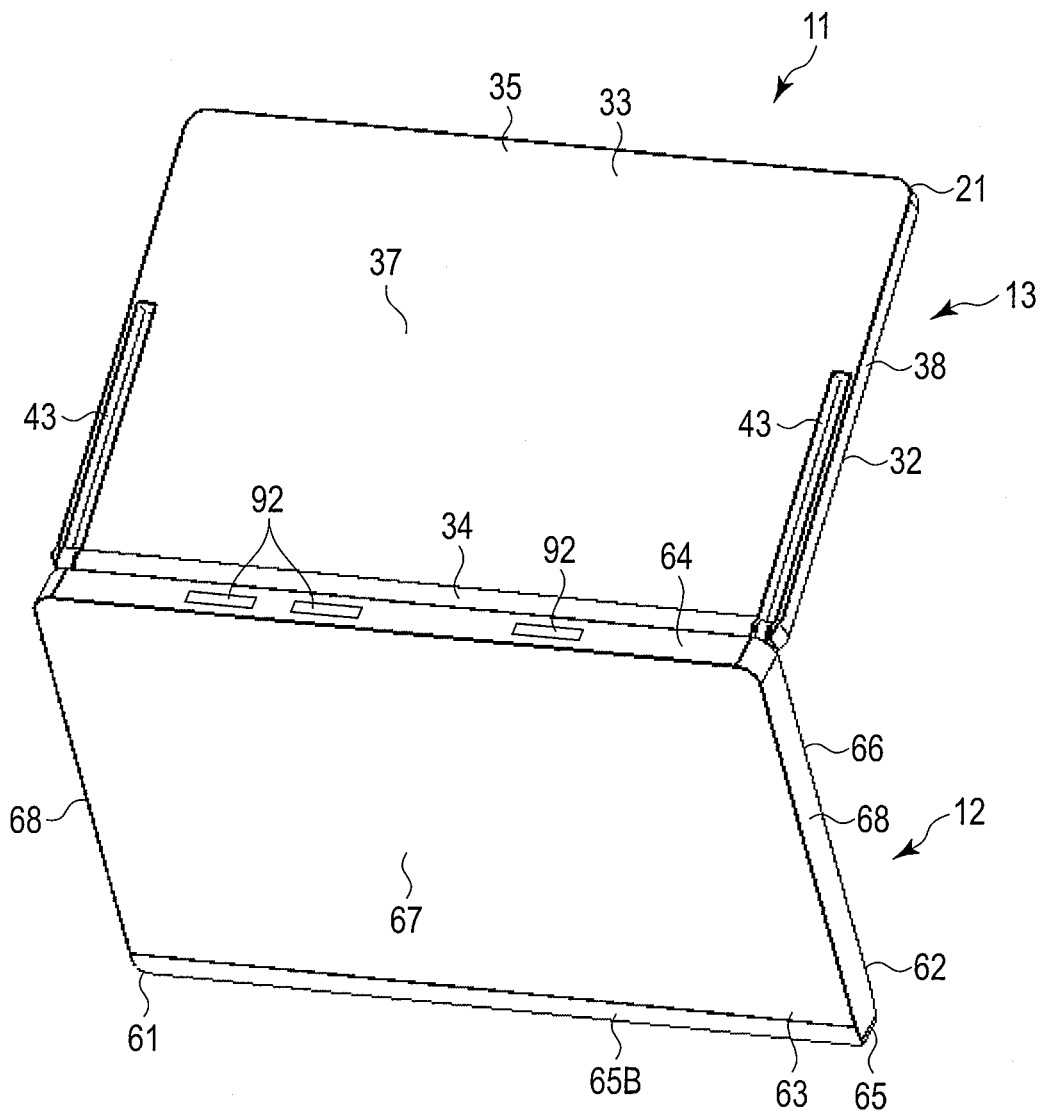
FIG. 2 is an exemplary perspective view of the portable computer shown in FIG. 1 viewed from the back.
Figure 2:
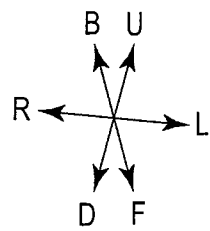
Figure 3:
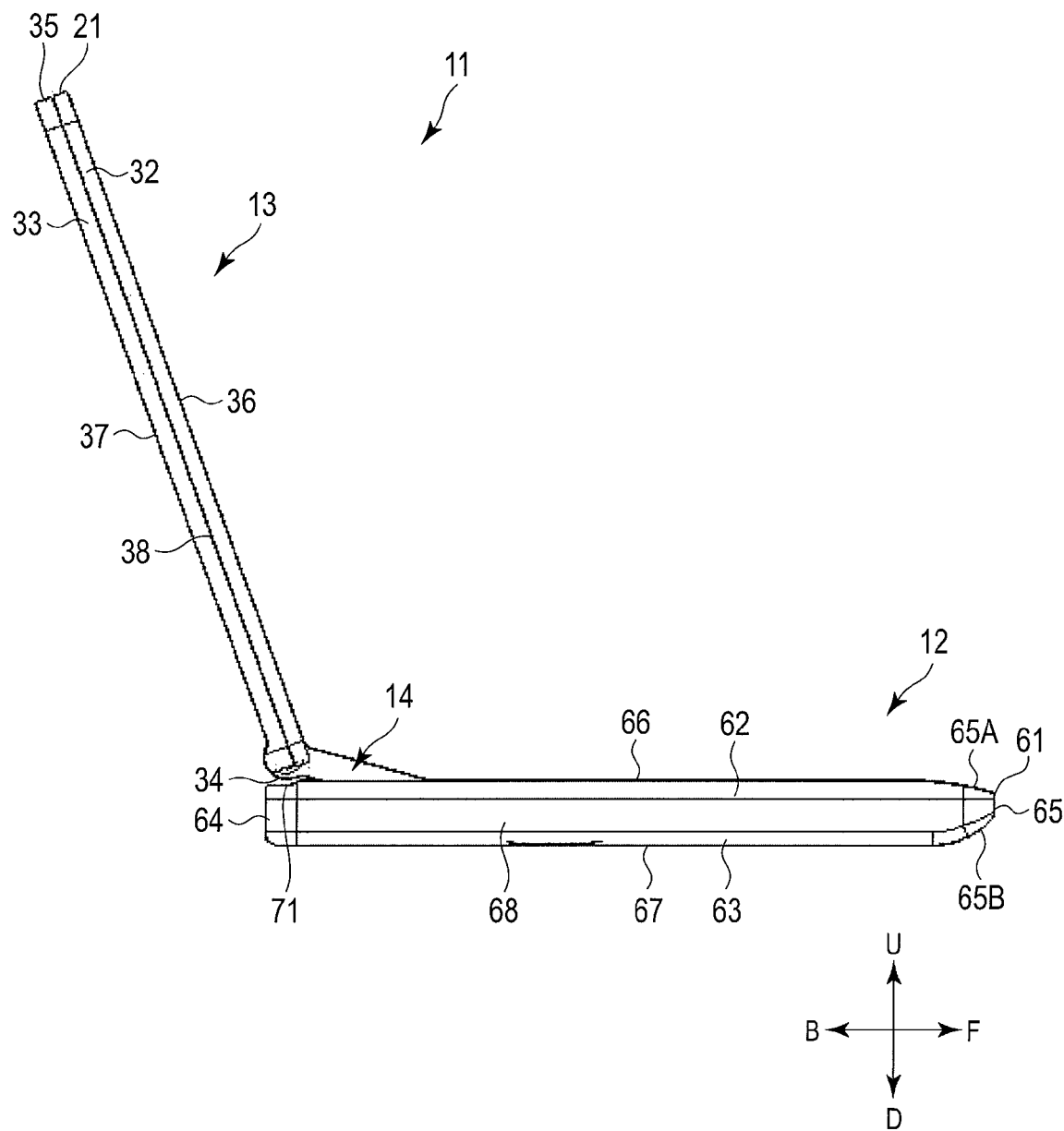
FIG. 3 is an exemplary side view of the portable computer shown in FIG. 1 viewed from the left.

As shown in FIG. 2, the cover 33 includes a pair of groove-shaped (slit-shaped; slot-shaped) second hollow portions (second openings; second concave portions) 43 extending along the second side surface 38 of the display cabinet 21 at both of the end portions in the rightward and leftward directions of the display module 13, and each of the second hollow portions 43 is depressed toward the mask 32 from the top surface of the cover 33. In a tablet configuration (overlapping configuration; folded configuration), in which the display screen 22A faces in a direction opposite to the main body 12 and the display module 13 overlaps with the main body 12, a part (a second end 53, a second portion 54, an elbow 55, and the like) of the arm portion 14 can be housed in the second hollow portion 43 (see FIG. 17). The display panel 22 comprises a liquid crystal display panel, for example, but may comprise other types of display panels such as a plasma display panel, an organic electroluminescent display panel, a plastic display panel, and a sheet display panel.

As shown in FIG. 1, the pair of arm portions 14 is provided in the vicinity of both of the right and left end portions of the display module 13 and the main body 12. In other words, the pair of arm portions 14 is provided in the vicinity of the second side surface 38 of the display module 13 and the first side surface 68 of the main body 12. According to the above-described arrangement of the arm portions 14, restrictions are not imposed on implementation of internal components of the display module 13 and the main body 12.

One of the arm portions 14 is bilaterally symmetrical to (a mirror image of) the other arm portion 14. Each of the arm portions 14 is in the form of a rod (pole; pipe; duct) having rigidity (made of a rigid material). More specifically, each of the arm portions 14 is in the form of a bow-like (arc-like; arch-like) rod which is convex (protrudes; projects) toward a direction opposite to a direction of a second connector (component) 94, which will be described later, as a whole when the arm portion 14 is in a second position P2 (see FIGS. 1 and 17, for example). The arm portion 14 is made of a synthetic resin material, for example, so as to have a square (rectangular) cross section (cut end) and have a hollow body (have a cavity inside). The material of the arm portion 14 is not limited to a synthetic resin material, and may be a metal or another material, such as ceramic and fiber-reinforced plastic (FRP). The hollow part inside the arm portion 14 forms a housing portion.

Figure 10:
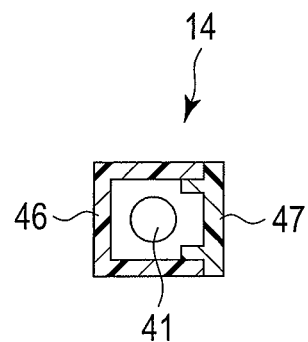
FIG. 10 is an exemplary cross-sectional view illustrating the arm portion shown in FIG. 6, cut along a direction crossing a longitudinal direction.

As shown in FIG. 9, the harness 41 (LCD harness; cable) runs through the housing portion of the left arm portion 14, so as to connect the first printed circuit board 83 of the main body 12 and the second printed circuit board 26 of the display module 13. A first cable 44, designed to connect the first printed circuit board 83 of the main body 12 and the camera 24 of the display module 13, and a second cable 45, designed to connect the first printed circuit board 83 of the main body 12 and the antenna 25 of the display module 13, run through the housing portion of the right arm portion 14. As shown in FIG. 10, each of the arm portions 14 includes, for example, a first member (main body member) 46 having a C-shaped (U-shaped) cross section, and a lid-like (plate-like; plug-like) second member (fitting member; engaging member; plate material) 47 which fits in (interlocks with; engages with) the first member 46 so as to seal (block) the housing portion (opening) inside the first member 46.

Figure 6:
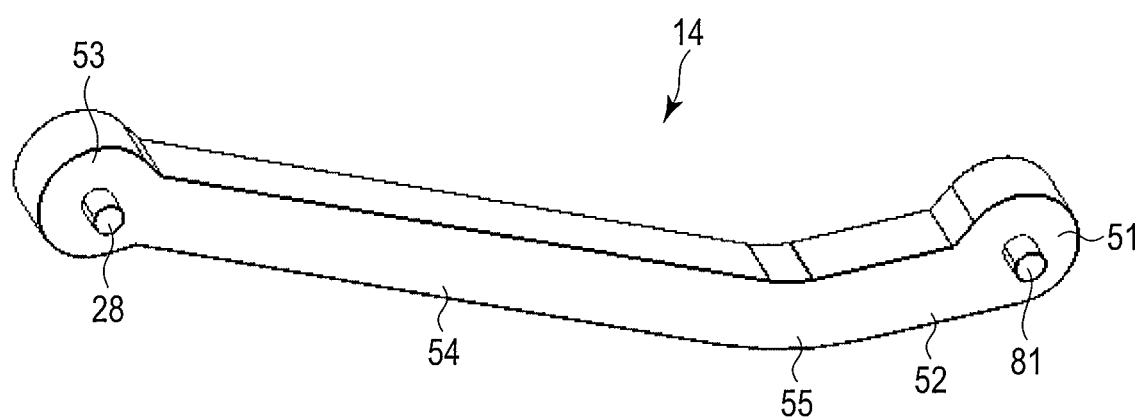
FIG. 6 is an exemplary perspective view illustrating a right arm portion of a pair of arm portions of the portable computer shown in FIG. 1.

As shown in FIG. 6, for example, each of the arm portions 14 includes a first end (first holding member) 51 provided so as to be fixed to (not to rotate about) the first axis 81 (first rotation center; first supporting member) of the main body 12, a first member 52 which linearly (straightly) extends from the first end 51, a second end (second holding member) 53 provided so as to be fixed to (not to rotate about) the second axis 28 of the display module 13, a second portion 54 which linearly extends from the second end 53, and an elbow portion (curved portion; angular portion; bent portion) 55 which couples the first portion 52 and the second portion 54. (FIG. 6 shows a part of the first axis 81 and the second axis 28, and, in actuality, each of the first axis 81 and the second axis 28 has a length (a length greater than a width as viewed in the rightward and leftward directions of the arm portion; a length greater than a width as viewed in the rightward and leftward directions of the first hollow portion 72; a length extending from the first side surface 68 of the main body 12 to a first metallic part 95) shown in FIGS. 7 and 8. Each of the arm portions 14 is provided so as to be fixed to the first axis 81 and the second axis 28. Since the first axis 81 is provided so as to be rotatable about the other parts of the main body 12, and the second axis 28 is provided so as to be rotatable about the other parts of the display module 13, each of the arm portions 14 is substantially rotatable about the first axis 81 and the second axis 28.

Figure 4:
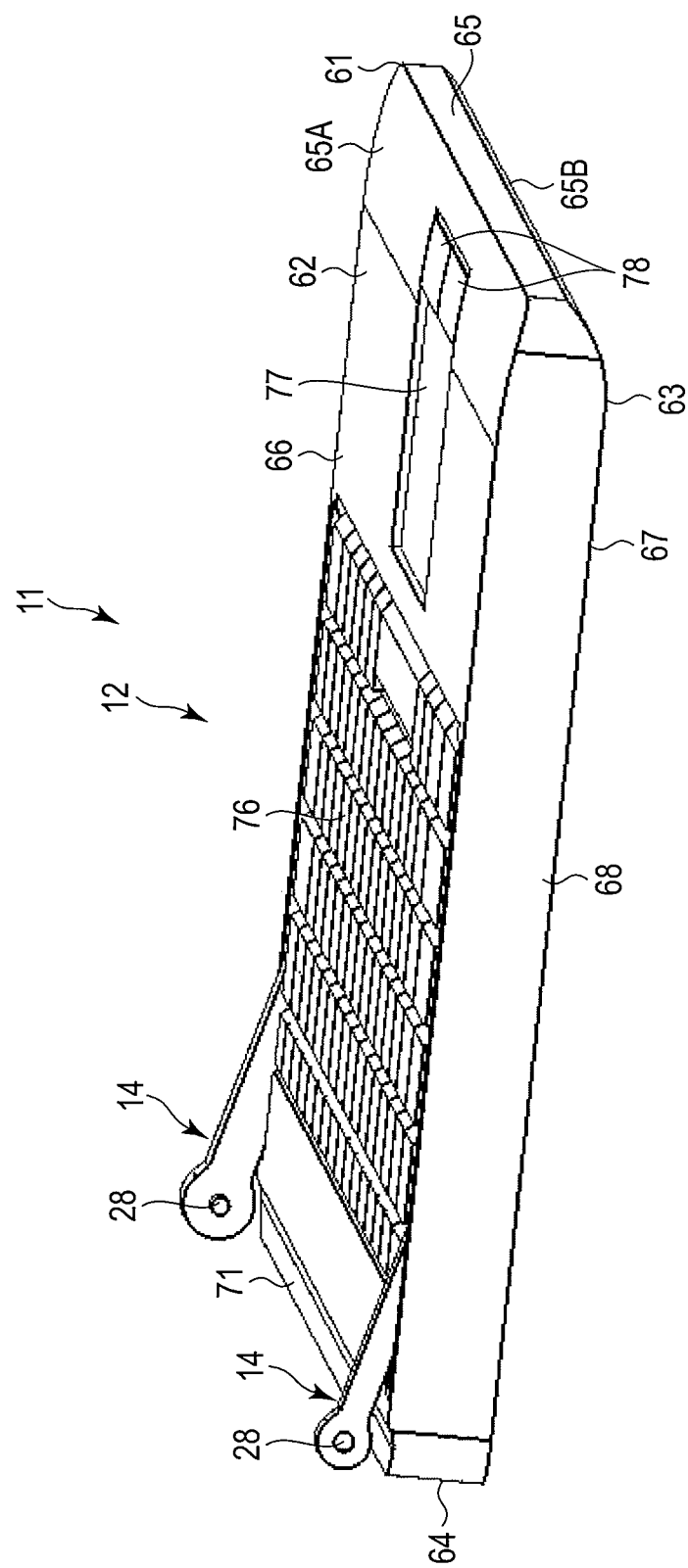
FIG. 4 is an exemplary perspective view illustrating a concave portion provided at the back of a main body of the portable computer shown in FIG. 1.
Figure 5:
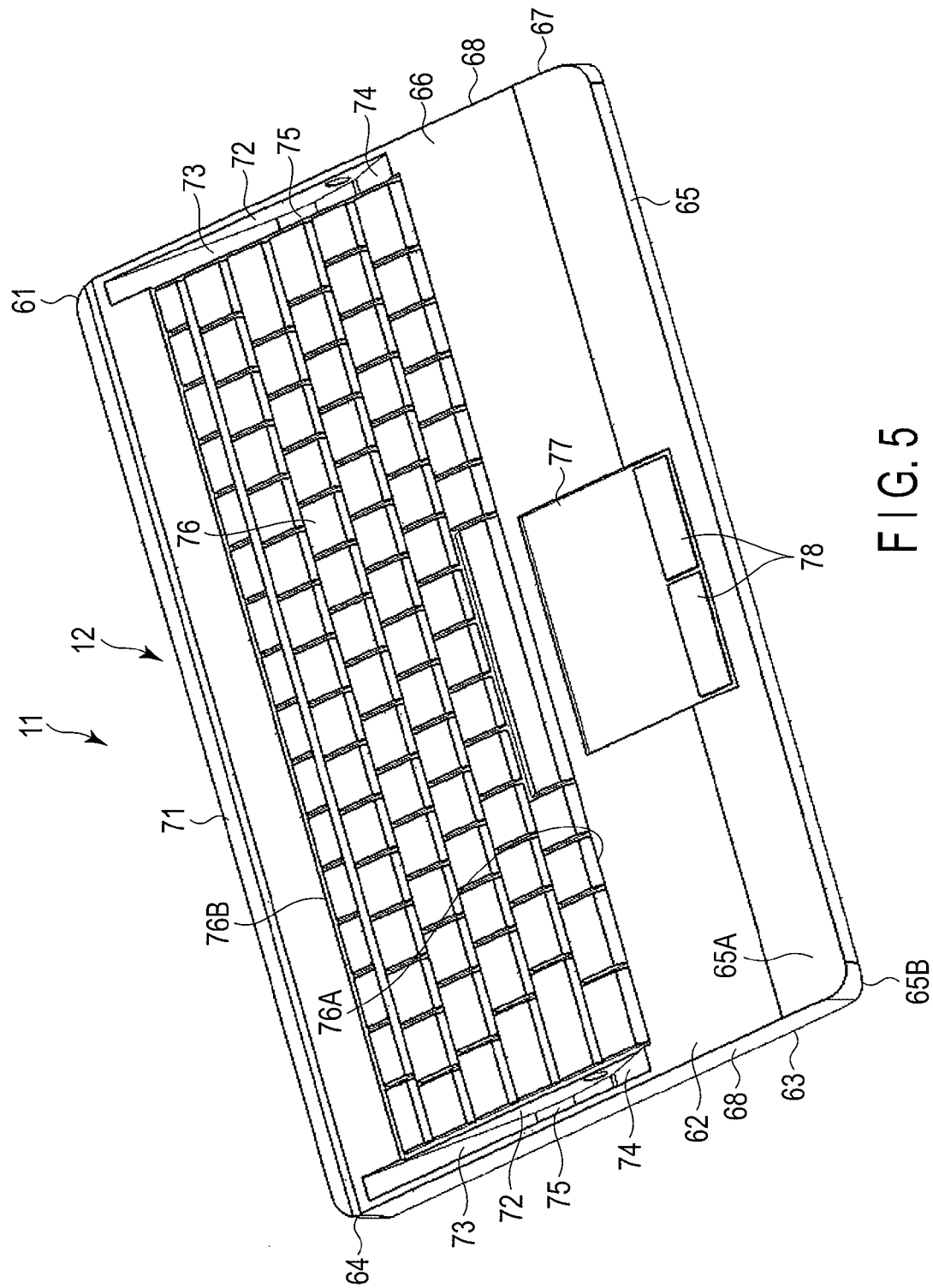
FIG. 5 is an exemplary perspective view illustrating a pair of hollow portions provided in the portable computer shown in FIG. 1.

As shown in FIGS. 1, 4, and 5, the main body 12 includes a main body cabinet (main body case; first housing) 61 made of synthetic resin in the form of a box (container), for example. The main body cabinet 61 is formed by joining the first case 62 forming the upper half and the second case 63 forming the lower half. The main body cabinet 61 includes: a first end portion 64 (first side; back surface) on the back side; a second end portion 65 (second side; front surface) on the side (front side) opposite to the first end portion 64; a first surface (upper surface) 66 facing the display module 13; a second surface 67 opposite to the first surface 66; a pair of first side surfaces 68 each crossing (orthogonal to) the first surface 66 and the second surface 67 so as to be continuous with the first end portion 64 and the second end portion 65; a concave portion 71 provided in the vicinity of the first end portion 64 on the first surface 66 so as to be depressed in an approximately semicircular (arc-like) shape from the top surface; and a pair of first hollow portions (first openings; first concave portions) 72 provided so as to be depressed from the first surface 66 in a position apart from a keyboard (operating module; input module) 76, which will be described later. As shown in FIG. 4, for example, the second end portion 65 includes a first slanting portion 65A provided on the side of the first surface 66 so as to slant against (cross; have an inclination from) the first surface 66, and a second slanting portion 65B provided on the side of the second surface 67 so as to slant against (cross; have an inclination from) the second surface 67. Accordingly, the second end portion 65 has a thickness smaller than those of the other parts of the main body 12. The housing of the portable computer 11 comprises the main body cabinet 61 and the display cabinet 21.

As shown in FIG. 5, in the present embodiment, the pair of first hollow portions 72 is provided at both of the right and left end portions of the main body 12 in a position closer to the back of the main body 12 (than the second connector 94 and the touchpad 77). Each of the first hollow portions 72 extends in a groove-like form along the first side surface 68 of the main body cabinet 61, and is depressed along the elbow portion 55 and the other parts of the arm portion 14. Each of the first hollow portions 72 includes a first inclined portion (first sloped portion; first gradient) 73, on which the arm portion 14 in a first position P1, which will be described later, abuts; a second inclined portion (second sloped portion; second gradient) 74 slanting along the arm portion 14 which is in the second position P2; and a bottom portion (intermediate portion; abutting portion) 75 which is provided between the first inclined portion 73 and the second inclined portion 74 and on which the elbow portion 55 of the arm portion 14 abuts. Each of the first hollow portions 72 can house the arm portion 14 which is in the first position P1 inside.

Figure 7:
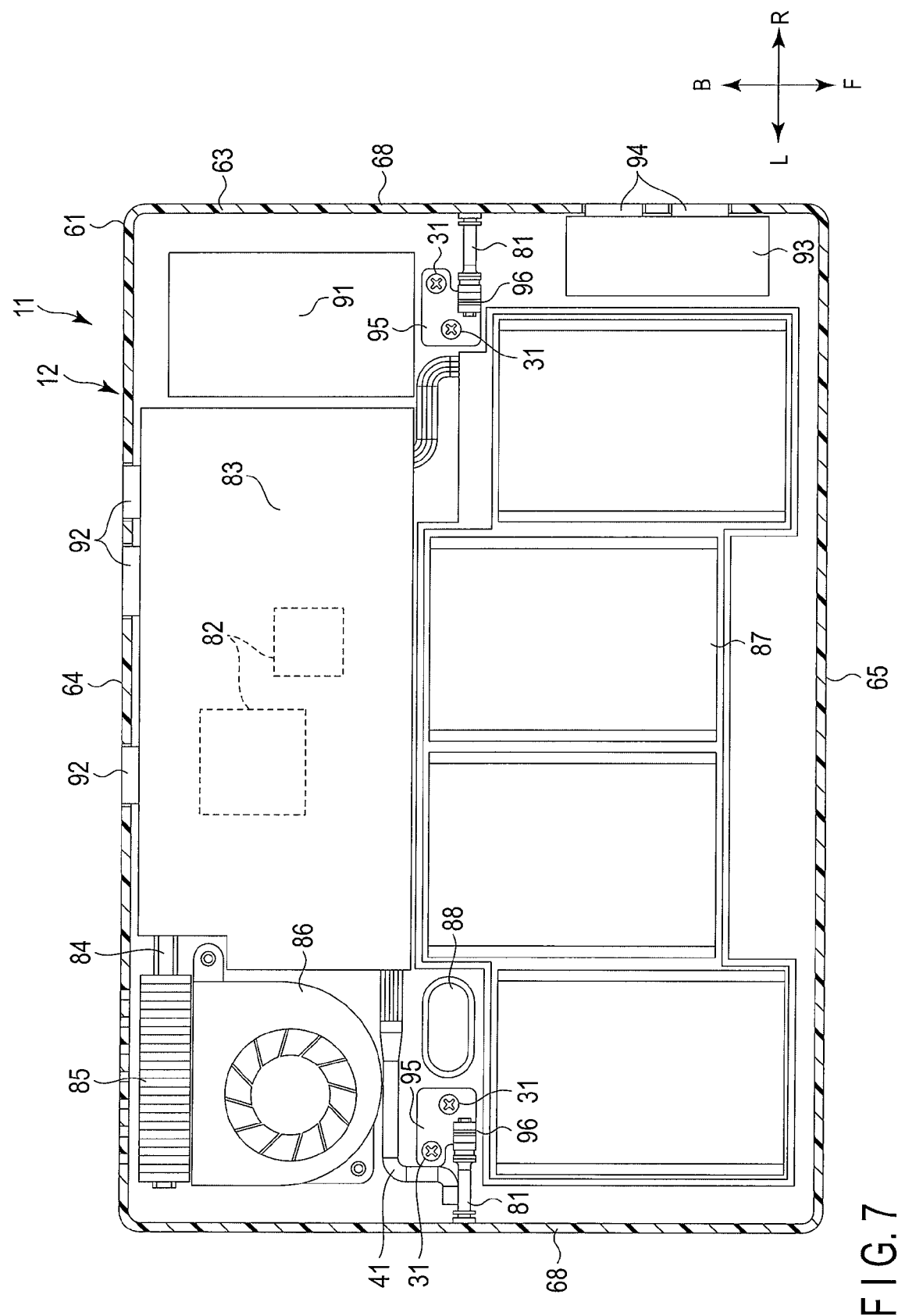
FIG. 7 is an exemplary cross-sectional view of the main body of the portable computer shown in FIG. 1 cut along a horizontal direction.

As shown in FIGS. 1 and 7, the main body 12 includes: a keyboard 76 attached to an outer side of the main body cabinet 61; a touchpad (touch sensor; contact sensor; pointing device) 77 and a button (operating module; touchpad button) 78 attached to an outer side of the main body cabinet 61; a first axis 81 provided between the first end portion (first side; back surface) 64 and the second end portion (second end; front surface) 65; a first printed circuit board 83 which is provided inside the main body cabinet 61 in a position closer to the back (than the main battery 87) and on which a circuit component 82, which is the CPU, for example, is mounted; a heat pipe (thermal transport means; thermal transport module) 84 thermally connected to the circuit component 82 at one end portion so as to cool the circuit component 82; a fin unit (fin; fins; radiating plate) 85 fixed to the other end portion of the heat pipe 84; a fan unit (fan; air distribution module; air distribution device) 86 provided inside the main body cabinet 61 and configured to promote cooling of the heat pipe 84 and the fin unit 85; a main battery (first battery) 87 and an auxiliary battery (second battery) 88 provided inside the main body cabinet 61; a storage unit (storage means; storage device) 91 provided in the vicinity of the first printed circuit board 83 inside the main body cabinet 61 and connected to the first printed circuit board 83 via a cable, for example; a first connector 92 for external connection provided in the first printed circuit board 83 and exposed to the outside at the back (first end portion 64) of the main body 12; a connector substrate 93 provided separately from the first printed circuit board 83 inside the main body cabinet 61 in a position closer to the front of the main body cabinet 61 and connected to the first printed circuit board 83 via a flexible cable, for example; a second connector (component) 94 for external connection provided on the connector substrate 93 and exposed to the outside from the first side surface 68; a first metallic part (first supporting portion) 95 which rotatably supports the first axis 81; a fixing member (screw; engaging portion) 31 configured to fix the first metallic part 95 to the main body cabinet 61; and a first applying portion (first braking module; first resistance unit) 96 configured to apply a torque to the first axis 81. In the present embodiment, the fixing member 31 comprises a screw as an example, but is not limited thereto and may comprise another component or member such as an engaging claw and a hook.

The second connector 94 is an example of a component provided in the main body 12 (in the vicinity of the first side surface 68 of the main body 12) in a position (part; portion; point) bypassed by (avoided by; apart from) the elbow portion 55, but the component is not limited thereto. The component may be a storage unit such as a hard disc drive and an SSD, a battery, a printed circuit board provided with a circuit component, a heat pipe or a fin unit, a cooling device including a fan unit, a display panel such as a liquid crystal display, a touchpanel, an antenna, a camera, an audio component such as a speaker, an operating button, a slot for various types of memory cards and authentication cards, a communication module such as a wireless LAN module, or other components.

A pair of first axes 81 is provided at a midpoint (intermediate part; central part) in the longitudinal direction of the main body 12, in a position closer to the back side than the front end 76A of the keyboard 76 and the touchpad 77 and closer to the front side than the back end 76B of the keyboard 76, for example. The first axis 81 is provided between the first surface 66 and the second surface 67 (see FIG. 16). The storage unit 91 comprises a hard disc drive (HDD), for example, but may be other storage means such as a solid-state drive (SSD) and other flash memories. The first applying module 96 applies a torque (resistance) to the first axis 81 when the arm portion 14 is in a first position P1 or a second position P2, which will be described later, in order to prevent the first axis 81 from rotating.

Next, the movement of the portable computer 11 when the configuration of the portable computer 11 is changed will be described with reference to FIGS. 11 to 17.

Figure 11:
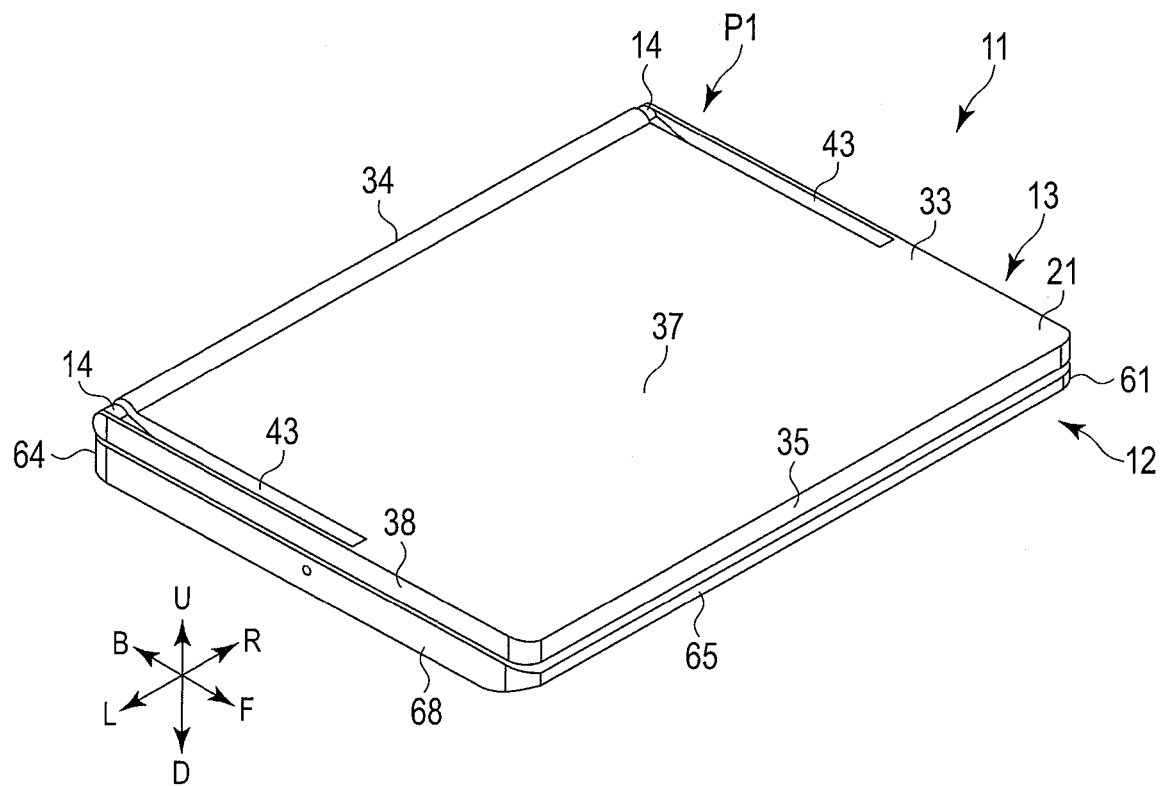
FIG. 11 is an exemplary perspective view of a portable configuration of the portable computer shown in FIG. 1.
Figure 16:
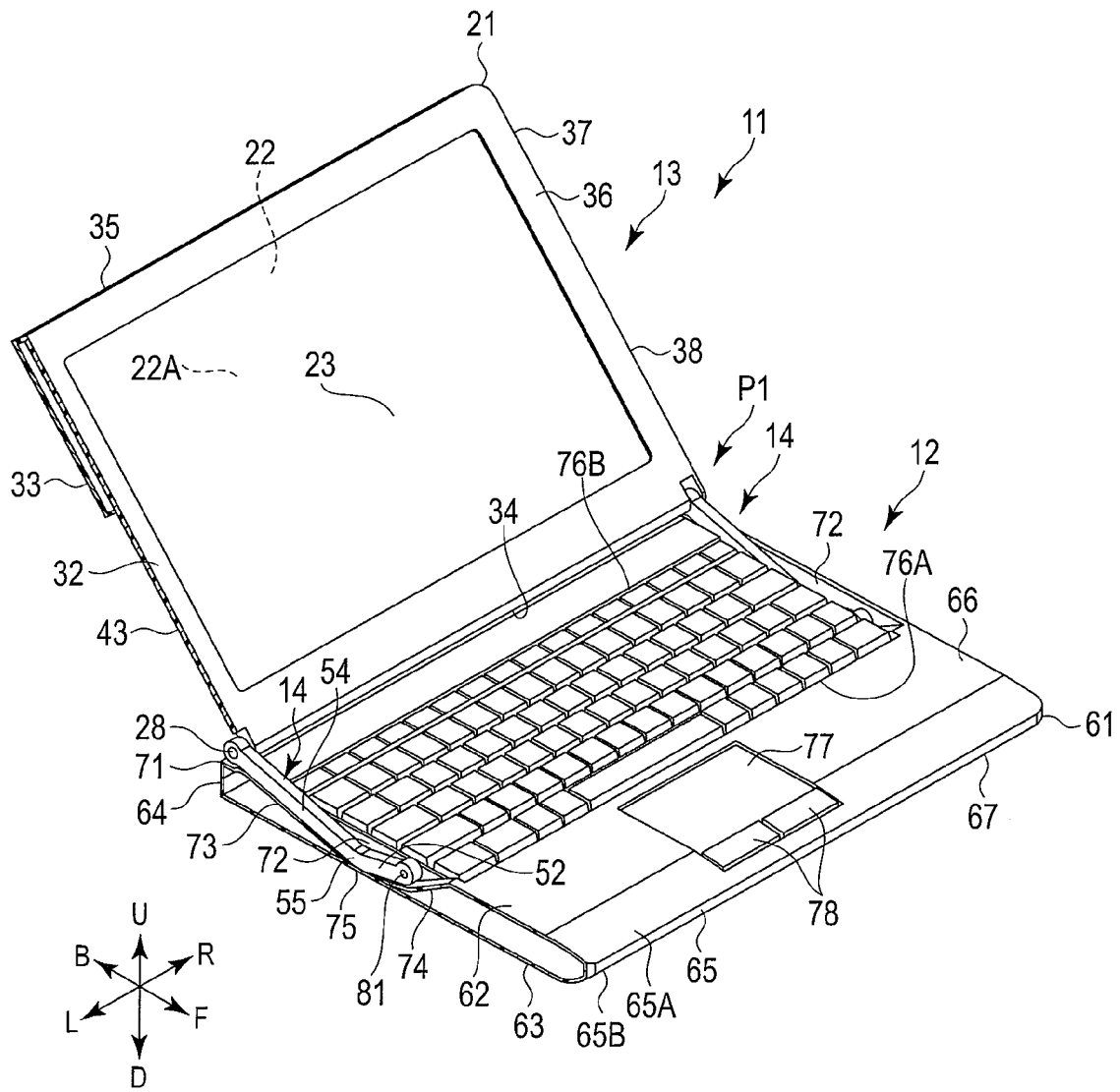
FIG. 16 is an exemplary perspective view illustrating an inside of a part of the main body and the display module of the portable computer shown in FIG. 12 cut along a longitudinal direction (direction in which the arm portion extends)

FIG. 11 shows a state in which the display screen 22A faces in (is opposed to) a direction of the main body 12, and the display module 13 overlaps with the main body 12, i.e., a portable configuration (a closed configuration in which the display module 13 is closed). When the display module 13 is rotated about the second axis 28, the notebook portable computer 11 will be in a usual deployed configuration (an open configuration in which the display module 13 is open), as shown in FIG. 12. In the above-described states, the arm portion 14 is in a first position P1, where the second axis 28 of the display module 13 is positioned in the vicinity of the first end portion 64 of the main body 12. As shown in FIG. 16, when the arm portion 14 is in the first position P1, one end portion 34 of the display module 13 fits in (interlocks with; engages with) the concave portion (concave surface; concave part) 71 and housed therein. In this case, since the display module 13 is designed not to be positioned on the back side (rear side; back part) of the first end portion 64 of the main body 12, a mounting space (region; installation site) for the first connector 92, for example, is secured in the first end portion 64.

Figure 13:
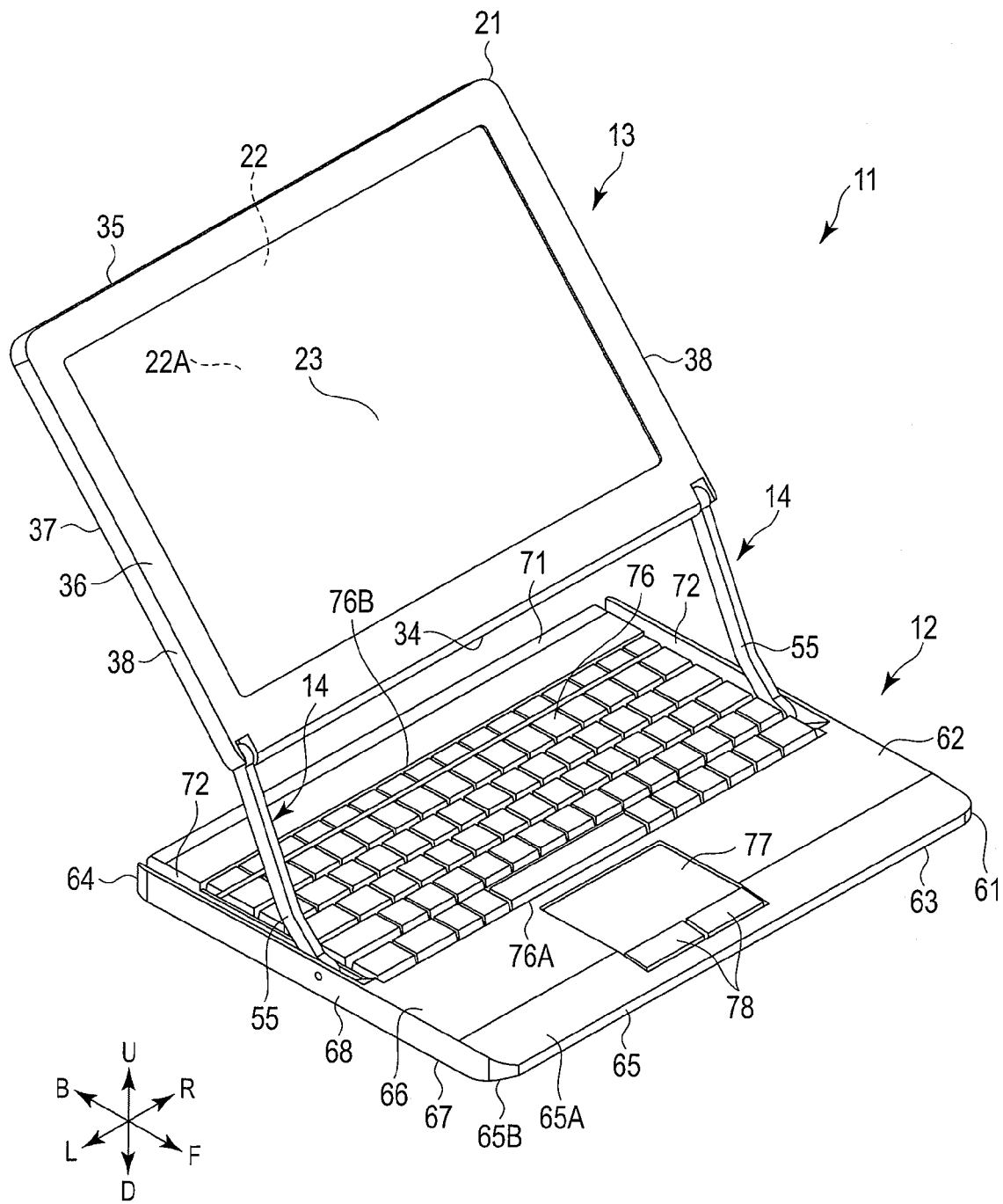
FIG. 13 is an exemplary perspective view illustrating a transition configuration in which the arm portion of the portable computer shown in FIG. 12 is moved from a first position to a second position.
Figure 14:
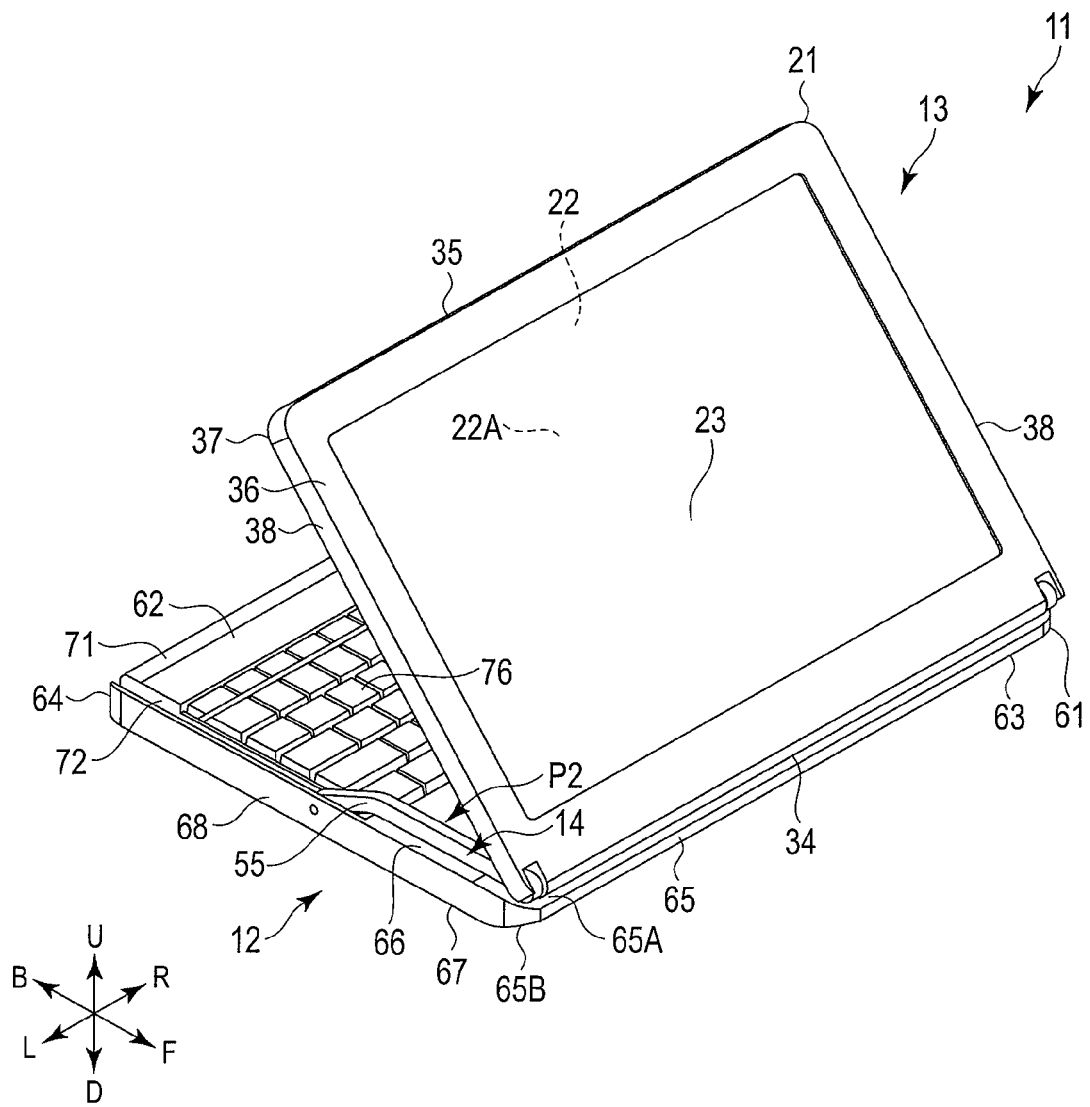
FIG. 14 is an exemplary perspective view illustrating a first tablet configuration in which the arm portion of the portable computer shown in FIG. 13 is in the second position.
Figure 15:
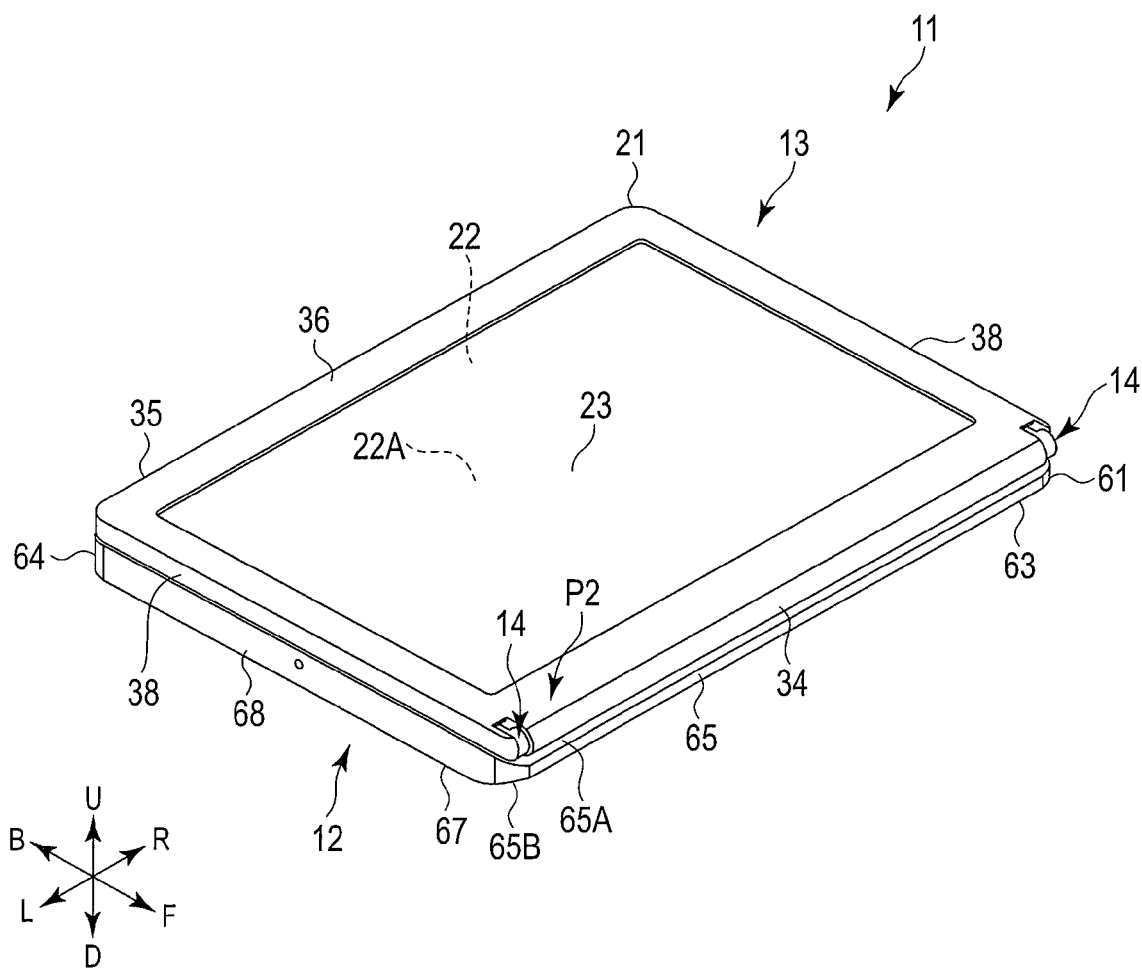
FIG. 15 is an exemplary perspective view illustrating a second tablet configuration in which the display module of the portable computer shown in FIG. 14 is rotated about a second axis.
Figure 17:
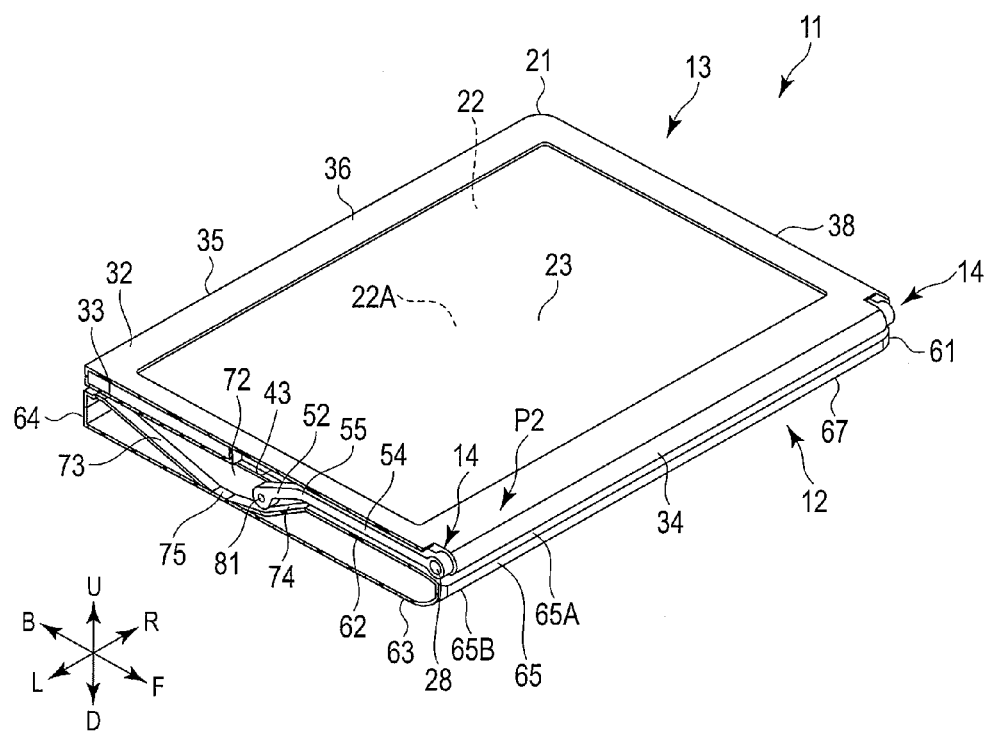
FIG. 17 is an exemplary perspective view illustrating an inside of a part of the main body and the display module of the portable computer shown in FIG. 15 cut along a longitudinal direction (direction in which the arm portion extends)

From this state, when the user grips (holds; grasps) the display module 13, for example, with his or her hand in order to rotate the arm portion 14 in the forward direction, as shown in FIG. 13, the second axis 28 of the display module 13 will be positioned in the vicinity (neighborhood) of (arranged adjacent to) the second end portion 65 of the main body 12. In this case, the portable computer 11 will be in a state as shown in FIG. 14, and the position of the arm portion 14 in this position will be referred to as a second position P2. In the state shown in FIG. 14, the portable computer 11 is in a configuration designed for use on the desk, i.e., a tablet configuration (desk configuration) (first tablet configuration). When the display module 13 is further rotated about the second axis 28 from this state, the portable computer 11 will be in a state in which the display screen 22A faces in a direction opposite to the main body 12 and the display module 13 overlaps with the main body 12, i.e., a tablet configuration in which the keyboard 76 is hidden (covered; housed) (second tablet configuration). This state is mainly designed for use with the hand or on the desk. As shown in FIG. 17, in this tablet configuration, the second axis 28 of the display module 13 overlaps with the second end portion 65 (first slanting portion 65A) of the main body 12. Thereby, the dimensions (length and width) are prevented from increasing around the axis (second axis 28), where the dimensions in the thickness direction of the main body 12 and the dimensions in the thickness direction of the display module 13 tend to increase. When the arm portion 14 is in the second position P2, since the second connector (component) 94 is bypassed by (avoided by; apart from) the elbow portion 55, the arm portion 14 will not interfere with (abut; contact; obstruct) the second connector 94 (see FIGS. 1 and 17, for example).

According to the first embodiment, the portable computer 11 comprises: a main body 12 including a first end portion 64, a second end portion 65 on a side opposite to the first end portion 64, and a first axis 81 positioned between the first end portion 64 and the second end portion 65; a display module 13 including a second axis 28 positioned in the vicinity of an end portion on a side closer to the main body 12, and a display screen 22A; an arm portion 14 which couples the first axis 81 and the second axis 28, includes an elbow portion (bent portion) 55 at a predetermined point, and is rotatable about the first axis 81 between a first position P1 in which the second axis 28 is positioned in the vicinity (neighborhood) of the first end portion 64 and a second position P2 in which the second axis 28 is positioned in the vicinity of the second end portion 65; and a component (member; device; equipment) provided in the main body 12 in a position bypassed by (avoided by; apart from) the elbow portion 55 when the arm portion 14 is in the second position P2.

According to the above-described configuration, compared to the conventional portable computer, it is possible to achieve both the usual deployed configuration and the tablet configuration merely by making a slight modification to add the arm portion 14 and the first axis 81. Thereby, user-friendliness is improved, and increase in weight and the number of components of the portable computer 11 can be prevented. Further, since the component is bypassed by the elbow portion 55, when the arm portion 14 is positioned in the second position P2, the component and the arm portion 14 will not interfere with each other. It is thereby possible to secure space for providing the component and efficiently use the space inside the main body 12, and to make the portable computer 11 thinner and smaller by reducing the thickness of the main body 12.

When the arm portion 14 is in the second position P2, the arm portion 14 is bent (warped; curved) so as to be convex (protrude; project) toward the side opposite to the component. With this configuration, it is possible to further prevent the arm portion 14 in the second position P2 from interfering with the component and to secure space for mounting the component and make the main body 12 smaller.

The main body 12 includes a hollow portion (opening; concave portion), which is depressed along the elbow portion 55, and can house the arm portion 14 when the arm portion 14 is in the first position P1. With this configuration, when the arm portion 14 is in the first position P1, it is possible to prevent the arm portion 14 from wobbling and stabilize the position of the arm portion 14, thereby preventing the display module 13 from wobbling. Further, the arm portion 14 can be housed unobtrusively, thereby making the appearance of the portable computer 11 favorable. Moreover, since the rotation angle of the arm portion 14 can be restricted by the hollow portion, a component for restricting the rotation angle of the arm portion 14 does not need to be provided separately.

The portable computer 11 comprises an applying portion (braking module; resistance unit) which applies a predetermined torque to the arm portion 14 which is in the first position P1 or the second position P2 so as to prevent the arm portion 14 from rotating about the first axis 81. With this configuration, when the arm portion 14 is in the first position P1 or the second position P2, it is possible to prevent the arm portion 14 from shifting upward (moving from the first position P1 and the second position P2), thereby preventing the display module 13 from wobbling.

The arm portion 14 is bent along the first surface 66 of the main body 12 facing the display module 13 of the main body 12, and is positioned on the first surface 66 when the arm portion 14 is in the second position P2. With this configuration, when the arm portion 14 is in the second position P2, the display module 13 is prevented from wobbling. Further, since a depression, for example, in which the arm portion 14 in the second position P2 fits, does not need to be provided, a space for mounting an internal component of the main body 12 under the first surface 66 is secured, and thereby high-density packaging is achieved.

The second end portion 65 has a thickness smaller than those of the other parts of the main body 12, and the second axis 28 overlaps with the second end portion 65 when the arm portion 14 is in the second position P2. With this configuration, when the arm portion 14 is in the second position P2, it is possible to prevent the thickness from increasing in the vicinity of the second axis 28, thereby making the portable computer 11 thinner.

The main body 12 includes a concave portion 71 which houses an end portion of the display module 13 on the side closer to the main body 12 when the arm portion 14 is in the first position P1. Thereby, when the arm portion 14 is in the first position P1, the display module 13 can be further prevented from wobbling.

The main body 12 includes a first surface 66 which faces the display module 13 and on which the keyboard 76 is provided, a second surface 67 opposite to the first surface 66, and a hollow portion which is provided in the main body 12 in a position apart from the keyboard 76 and is capable of housing the arm portion 14 which is in the first position P1. The first axis 81 is provided in a position between the first surface 66 and the second surface 67, and when the arm portion 14 is in the first position P1, the display module 13 is positioned closer to the back side than the keyboard 76. With this configuration, the arm portion 14 is housed in the hollow portion when the arm portion 14 is in the first position P1, and the first axis 81, the arm portion 14, and the display module 13 will not be an obstruction during keyboard operation, thereby making the operability of the keyboard 76 favorable.

Next, an electronic apparatus according to a second embodiment will be described with reference to FIGS. 18 and 19. A portable computer 11, which is an example of the electronic apparatus according to the second embodiment, is different from the portable computer 11 of the first embodiment in the configuration of a pair of arm portions (coupling portions; connecting portions) 14 and a first hollow portion 72 and the position of a second connector 94, but shares most of the other structural elements with the portable computer 11 of the first embodiment. Accordingly, structural elements different from those of the first embodiment will mainly be discussed, and the common structural elements will be denoted by the same reference numerals and detailed description of such elements will be omitted.

The second embodiment is the same as the first embodiment in that one of a pair of arm portions (coupling portions; connecting portions) 14 is bilaterally symmetrical to (a mirror image of) the other arm portion 14. In the second embodiment, however, the pair of arm portions 14 is bent so as to be convex toward a direction opposite to the arm portion 14 of the first embodiment.

Each of the arm portions 14 is in the form of a rod (pole; pipe; duct) having rigidity (made of a rigid material). More specifically, each of the arm portions 14 is in the form of a bow-like (arc-like; arch-like) rod which is convex (protrudes; projects) toward a direction opposite to a direction of a second connector (component) 94, which will be described later, as a whole when the arm portion 14 is in a first position P1. The arm portion 14 is made of a synthetic resin material, for example, so as to have a square (rectangular) cross section (cut end) and have a hollow body (have a cavity inside). A harness 41 (LCD harness; cable) runs through a housing portion inside a left arm portion 14, so as to connect a first printed circuit board 83 of a main body 12 and a second printed circuit board 26 of a display module 13. A first cable 44, designed to connect the first printed circuit board 83 of the main body 12 and a camera 24 of the display module 13, and a second cable 45, designed to connect the first printed circuit board 83 of the main body 12 and an antenna 25 of the display module 13, run through a housing portion inside a right arm portion 14.

Each of the arm portions 14 includes a first end (first holding member) 51 provided so as to be fixed to (not to rotate about) a first axis 81 (first rotation center; first supporting member) of the main body 12, a first member 52 which linearly (straightly) extends from the first end 51, a second end (second holding member) 53 provided so as to be fixed to (not to rotate about) a second axis (second rotation center; second supporting portion) 28 of the display module 13, a second portion 54 which linearly extends from the second end 53, and an elbow portion (curved portion; angular portion; bent portion) 55 which couples the first portion 52 and the second portion 54. Since the first axis 81 is provided so as to be rotatable about the other parts of the main body 12, and the second axis 28 is provided so as to be rotatable about the other parts of the display module 13, each of the arm portions 14 is substantially rotatable about the first axis 81 and the second axis 28.

The main body 12 includes a main body cabinet (main body case; first housing) 61 made of synthetic resin in the form of a box (container), for example. The main body cabinet 61 includes: a first end portion 64 (first side; back surface) on the back side; a second end portion 65 (second side; front surface) on the front side; a first surface (upper surface) 66 facing the display module 13; a second surface 67 opposite to the first surface 66; a pair of first side surfaces 68 each crossing (orthogonal to) the first surface 66 and the second surface 67 so as to be continuous with the first end portion 64 and the second end portion 65; a concave portion 71 provided in the vicinity of the first end portion 64 on the first surface 66 so as to be depressed in an approximately semicircular (arc-like) shape from the top surface; and a pair of first hollow portions (first openings; first concave portions) 72 provided so as to be depressed from the first surface 66 in a position apart from a keyboard (operating module; input module) 76, which will be described later. The second end portion 65 includes a first slanting portion 65A provided on the side of the first surface 66 so as to slant against (cross; have an inclination from) the first surface 66, and a second slanting portion 65B provided on the side of the second surface 67 so as to slant against (cross; have an inclination from) the second surface 67. Accordingly, the second end portion 65 has a thickness smaller than those of the other parts of the main body 12. The housing of the portable computer 11 comprises the main body cabinet 61 and the display cabinet 21.

Figure 18:
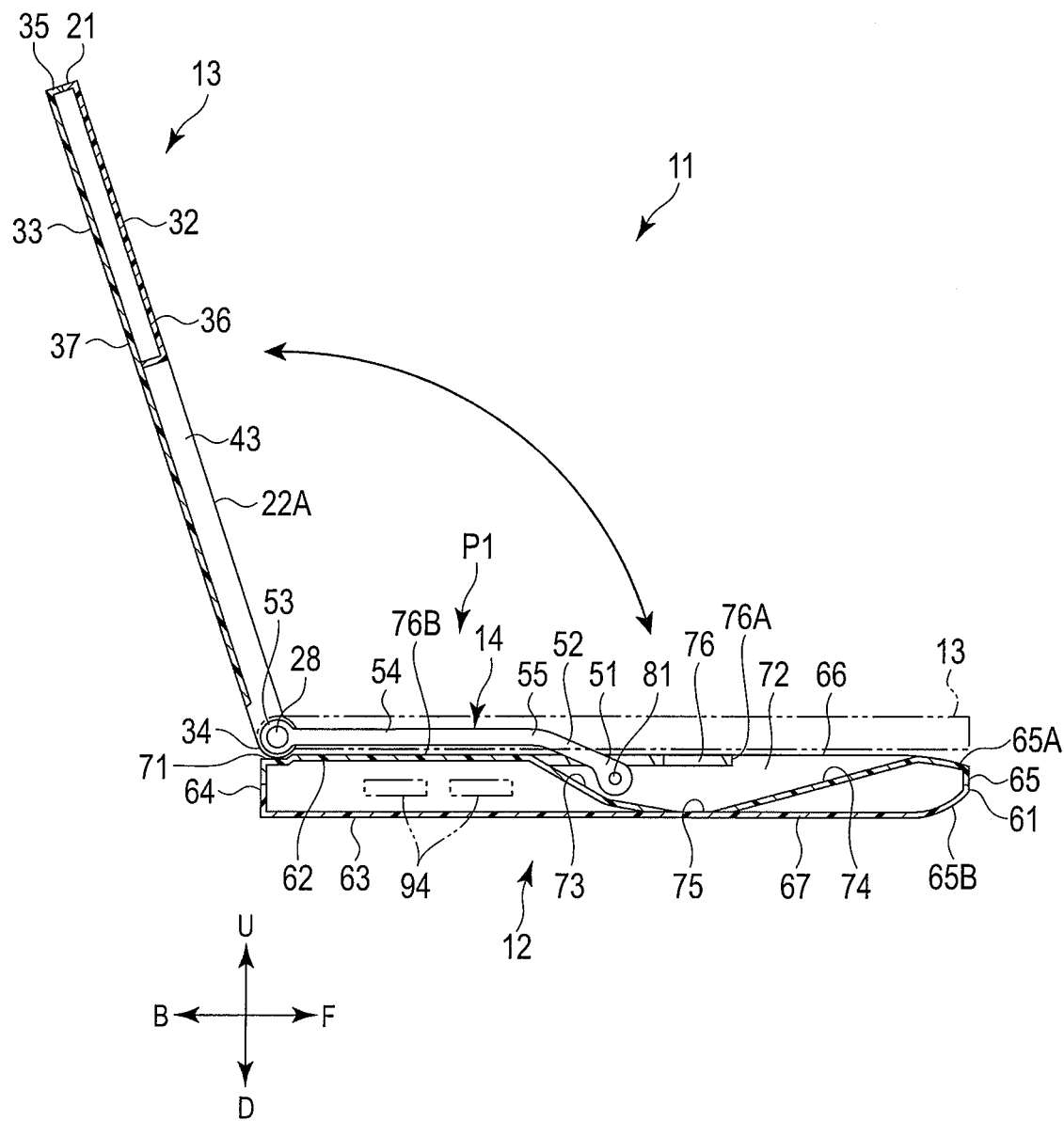
FIG. 18 is an exemplary cross-sectional view illustrating a state in which an arm portion of a portable computer, which is an example of an electronic apparatus according to a second embodiment, is in a first position.

As shown in FIG. 18, in the present embodiment, the pair of first hollow portions 72 is provided at both of the right and left end portions of the main body 12 in a position closer to the front of the main body 12 (than the second connector 94). Each of the first hollow portions 72 extends in a groove-like form along the first side surface 68 of the main body cabinet 61, and is depressed along the elbow portion 55 and the other parts of the arm portion 14. Each of the first hollow portions 72 includes a first inclined portion (first sloped portion; first gradient) 73 which slants along the arm portion 14 in a first position P1, which will be described later; a second inclined portion (second sloped portion; second gradient) 74, on which the arm portion 14 which is in a second position P2, which will be described later, abuts; and a bottom portion (intermediate portion; abutting portion) 75 which is provided between the first inclined portion 73 and the second inclined portion 74 and on which the elbow portion 55 of the arm portion 14 abuts. Each of the first hollow portions 72 can house the arm portion 14 which is in the second position P2 inside.

The main body 12 includes: a keyboard 76 attached to an outer side of the main body cabinet 61; a touchpad (touch sensor; contact sensor; pointing device) 77 and a button (operating portion; touchpad button) 78 attached to an outer side of the main body cabinet 61; a pair of first axes 81 provided at a midpoint (intermediate part; central part) in the longitudinal direction of the main body 12 between the first end portion (first side; back surface) and the second end portion (second side; front surface) 65, in a position closer to the back side than the front end 76A of the keyboard 76 and the touchpad 77 and closer to the front side than the back end 76B of the keyboard 76; a first printed circuit board 83 which is provided inside the main body cabinet 61 in a position closer to the back (than the main battery 87) and on which a circuit component 82, which is the CPU, for example, is mounted; a connector substrate 93 provided separately from the first printed circuit board 83 inside the main body cabinet 61 in a position closer to the front side of the main body cabinet 61 and connected to the first printed circuit board 83 via a flexible cable, for example; a second connector (component) 94 provided on the connector substrate 93; and a first applying portion (first braking module; first resistance unit) 96 configured to apply a torque to the first axis 81 when the arm portion 14 is in the first position P1 or the second position P2.

The second connector 94 is an example of a component provided in the main body 12 (in the vicinity of the first side surface 68 of the main body 12) in a position (part; portion; point) bypassed by (avoided by; apart from) the elbow portion 55, but the component is not limited thereto. The component may be a storage unit such as a hard disc drive and an SSD, a battery, a printed circuit board provided with a circuit component, a heat pipe or a fin unit, a cooling device including a fan unit, a display panel such as a liquid crystal display, a touchpanel, an antenna, a camera, an audio component such as a speaker, an operating button, a slot for various types of memory cards and authentication cards, a communication module such as a wireless LAN module, or other components.

Next, the movement of the portable computer 11 when the configuration of the portable computer 11 is changed will be described with reference to FIGS. 18 and 19.

In the state shown by the chain double-dashed line in FIG. 18, a state is shown in which the display screen 22A faces in (is opposed to) a direction of the main body 12 and the display module 13 overlaps with the main body 12, i.e., a portable configuration (a closed configuration in which the display module 13 is closed). When the display module 13 is rotated about the second axis 28, the portable computer 11 will be in a usual deployed configuration (an open configuration in which the display module 13 is open) of a notebook computer, as shown by the solid line in FIG. 18. In the above-described states, the arm portion 14 is in a first position P1, where the second axis 28 of the display module 13 is positioned in the vicinity (neighborhood) of the first end portion 64 of the main body 12. As shown in FIG. 18, when the arm portion 14 is in the first position P1, one end portion 34 of the display module 13 fits in (interlocks with; engages with) the concave portion (concave surface; concave part) 71 and housed therein. When the arm portion 14 is in the first position P1, since the second connector (component) 94 is bypassed by (avoided by; apart from) the elbow portion 55, the arm portion 14 will not interfere with (abut; contact; obstruct) the second connector 94 (see FIG. 18, for example).

Figure 19:
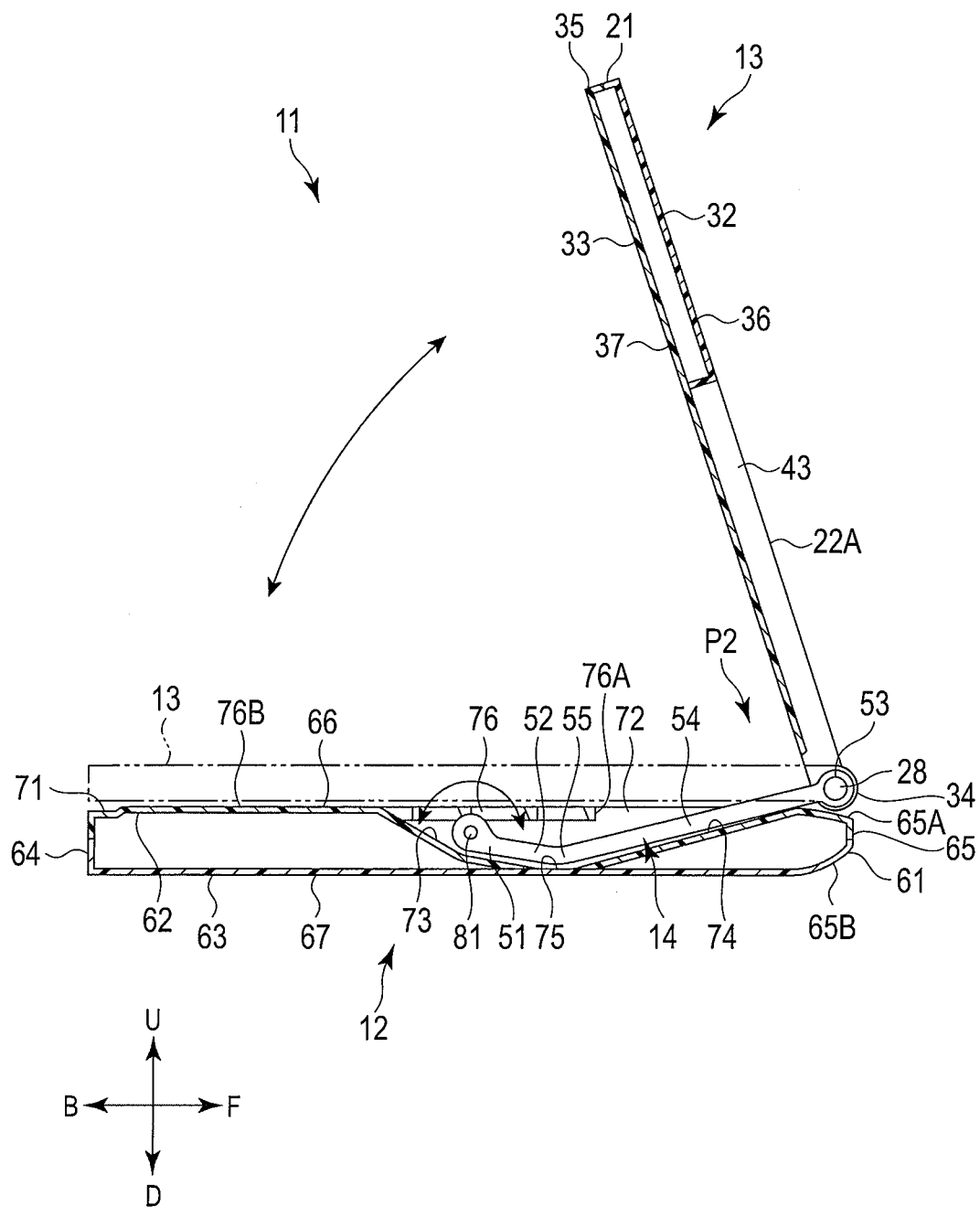
FIG. 19 is an exemplary cross-sectional view illustrating a state in which the arm portion of the portable computer shown in FIG. 18 is in a second position.

From this state, when the arm portion 14 is rotated in the forward direction, as shown in FIG. 19, the second axis 28 of the display module 13 will be positioned in the vicinity (neighborhood) of (arranged adjacent to) the second end portion 65 of the main body 12. The position of the arm portion 14 in this state will be referred to as a second position P2. The configuration shown by the solid line in FIG. 19 is a configuration designed for use on the desk, i.e., a tablet configuration (desk configuration) (first tablet configuration). When the display module 13 is further rotated about the second axis 28 from this state, as shown by the chain double-dashed line in FIG. 19, the portable computer 11 will be in a state in which the display screen 22A faces in a direction opposite to the main body 12 and the display module 13 overlaps with the main body 12, i.e., a tablet configuration in which the keyboard 76 is hidden (covered; housed) (second tablet configuration). In this tablet configuration, the second axis 28 of the display module 13 overlaps with the second end portion 65 (first slanting portion 65A) of the main body 12. Thereby, the dimensions (length and width) are prevented from increasing around the axis (second axis 28), where the dimensions in the thickness direction of the main body 12 and the dimensions in the thickness direction of the display module 13 tend to increase.

According to the second embodiment, the portable computer 11 comprises: a main body 12 including a first end portion 64, a second end portion 65 on a side opposite to the first end portion 64, and a first axis 81 positioned between the first end portion 64 and the second end portion 65; a display module 13 including a second axis 28 positioned in the vicinity of an end portion on a side closer to the main body 12, and a display screen 22A; an arm portion 14 which couples the first axis 81 and the second axis 28, includes an elbow portion (bent portion) 55 at a predetermined point, and is rotatable about the first axis 81 between a first position P1 in which the second axis 28 is positioned in the vicinity (neighborhood) of the first end portion 64 and a second position P2 in which the second axis 28 is positioned in the vicinity of the second en portion 65; and a component (member; device; equipment) provided in the main body 12 in a position bypassed by (avoided by; apart from) the elbow portion 55 when the arm portion 14 is in the first position P1.

With this configuration, since the component is bypassed by the elbow portion 55, when the arm portion 14 is positioned in the first position P1, the component and the arm portion 14 will not interfere with each other. It is thereby possible to secure space for providing the component and efficiently use the space inside the main body 12, and to make the portable computer 11 thinner and smaller by decreasing the thickness of the main body 12.

The main body 12 includes a hollow portion (opening; concave portion), which is depressed along the elbow 55, and can house the arm portion 14 when the arm portion 14 is in the second position P2. With this configuration, when the arm portion 14 is in the second position P2, it is possible to stabilize the position of the arm portion 14 and to prevent the arm portion 14 from wobbling.

The main body 12 includes a first surface 66 which faces the display module 13 and on which the keyboard 76 is provided, and a second surface 67 opposite to the first surface 66. The first axis 81 is provided in a position between the first surface 66 and the second surface 67, and when the arm portion 14 is in the first position P1, the display module 13 is positioned closer to the back side than the keyboard 76. With this configuration, the first axis 81 and the display module 13 will not be an obstruction during keyboard operation, thereby improving the operability of the keyboard 76.

Next, an electronic apparatus according to a third embodiment will be described with reference to FIGS. 20 and 21. A portable computer 11, which is an example of the electronic apparatus according to the third embodiment, is different from the portable computer 11 of the first embodiment in the position of the first axis 81, the shape of a pair of arm portions (coupling portions; connecting portions) 14, and the shape of a first hollow portion 72, but shares most of the other structural elements with the portable computer 11 of the first embodiment. Accordingly, structural elements different from those of the first embodiment will mainly be discussed, and the common structural elements will be denoted by the same reference numerals and detailed description of such elements will be omitted.

The third embodiment is the same as the first embodiment in that one of a pair of arm portions 14 is bilaterally symmetrical to (a mirror image of) the other arm portion 14. Each of the arm portions 14 is in the form of a rod (pole; pipe; duct) having rigidity (made of a rigid material). More specifically, each of the arm portions 14 is in the form of a bow-like (arc-like; arch-like) rod which is convex (protrudes; projects) toward a direction opposite to a direction of a second connector (component) 94, which will be described later, as a whole when the arm portion 14 is in a second position P2 (see FIG. 21). The arm portion 14 is made of a synthetic resin material, for example, so as to have a square (rectangular) cross section (cut end) and have a hollow body (have a cavity inside). A harness 41 (LCD harness; cable) runs through a housing portion inside a left arm portion 14, so as to connect a first printed circuit board 83 of a main body 12 and a second printed circuit board 26 of a display module 13. A first cable 44, designed to connect the first printed circuit board 83 of the main body 12 and a camera 24 of the display module 13, and a second cable 45, designed to connect the first printed circuit board 83 of the main body 12 and an antenna 25 of the display module 13, run through a housing portion inside a right arm portion 14.

Each of the arm portions 14 includes a first end (first holding member) 51 provided so as to be fixed to (not to rotate about) a first axis 81 (first rotation center; first supporting member) of the main body 12, a first member 52 which linearly (straightly) extends from the first end 51, a second end (second holding member) 53 provided so as to be fixed to (not to rotate about) a second axis 28 of the display module 13, a second portion 54 which linearly extends from the second end 53, and an elbow portion (curved portion; angular portion; bent portion) 55 which couples the first portion 52 and the second portion 54. Since the first axis 81 is provided so as to be rotatable about the other parts of the main body 12, and the second axis (second rotation center; second supporting portion) 28 is provided so as to be rotatable about the other parts of the display module 13, each of the arm portions 14 is substantially rotatable about the first axis 81 and the second axis 28.

The main body 12 includes a main body cabinet (main body case; first housing) 61 made of synthetic resin in the form of a box (container), for example. The main body cabinet 61 includes: a first end portion 64 (first side; back surface) on the back side; a second end portion 65 (second side; front surface) on the front side; a first surface (upper surface) 66 facing the display module 13; a pair of convex portions 97 protruding toward the display module 13 from the first surface 66; a second surface 67 opposite to the first surface 66; a pair of first side surfaces 68 each crossing (orthogonal to) the first surface 66 and the second surface 67 so as to be continuous with the first end portion 64 and the second end portion 65; a concave portion 71 provided in the vicinity of the first end portion 64 on the first surface 66 so as to be depressed in an approximately semicircular (arc-like) shape from the top surface; and a pair of first hollow portions (first openings; first concave portions) 72 provided so as to be depressed from the first surface 66 in a position apart from a keyboard (operating module; input module) 76, which will be described later. The second end portion 65 includes a first slanting portion 65A provided on the side of the first surface 66 so as to slant against (cross; have an inclination from) the first surface 66, and a second slanting portion 65B provided on the side of the second surface 67 so as to slant against (cross; have an inclination from) the second surface 67. Accordingly, the second end portion 65 has a thickness smaller than those of the other parts of the main body 12. The housing of the portable computer 11 comprises the main body cabinet 61 and the display cabinet 21.

Figure 20:
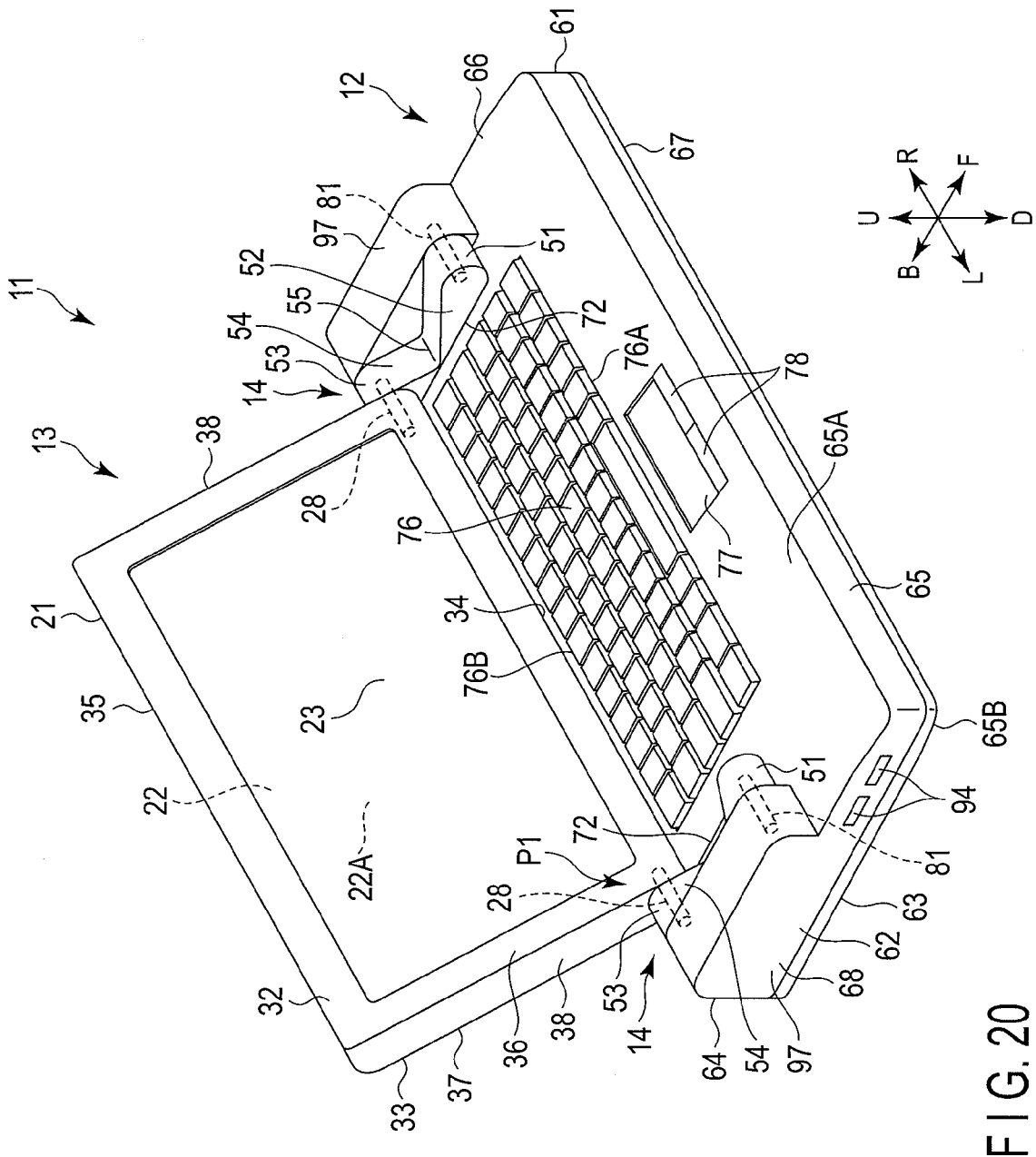
FIG. 20 is an exemplary perspective view illustrating a state in which an arm portion of a portable computer, which is an example of an electronic apparatus according to a third embodiment, is in a first position.

As shown in FIG. 20, for example, in the present embodiment, the pair of first hollow portions 72 is provided in a position closer to the back of the main body 12 (than the second connector 94). Each of the first hollow portions 72 extends in a groove-like form along the first side surface 68 of the main body cabinet 61, and is depressed along the elbow portion 55 and the other parts of the arm portion 14. Each of the first hollow portions 72 can house the arm portion 14 which is in the first position P1 inside.

The main body 12 includes: a keyboard 76 attached to an outer side of the main body cabinet 61; a touchpad (touch sensor; contact sensor; pointing device) 77 and a button (operating portion; touchpad button) 78 attached to an outer side of the main body cabinet 61; a pair of first axes 81 provided between the first end portion (first side; back surface) 64 and the second end portion (second end; front surface) 65; and a second connector (component) 94 provided on the connector substrate 93. The second connector 94 is provided in a position closer to the front of the main body 12 (in the vicinity of the first side surface 68) (than the convex portion 97).

The second connector 94 is an example of a component provided in the main body 12 (in the vicinity of the first side surface 68 of the main body 12) in a position (part; portion; point) bypassed by (avoided by; apart from) the elbow portion 55, but the component is not limited thereto. The component may be a storage unit such as a hard disc drive and an SSD, a battery, a printed circuit board provided with circuit components, a heat pipe or a fin unit, a cooling device including a fan unit, a display panel such as a liquid crystal display, a touchpanel, an antenna, a camera, an audio component such as a speaker, an operating button, a slot for various types of memory cards and authentication cards, a communication module such as a wireless LAN module, or other components.

The first axis 81 is provided in the convex portion 97 protruding toward the display module 13 from the first surface 66 at a midpoint (intermediate part; central part) in the longitudinal direction of the main body 12, i.e., in a position closer to the back side than the front end 76A of the keyboard 76 and the touchpad 77 and closer to the front side than the back end 76B of the keyboard 76. That is, the first axis 81 is positioned closer to the side (upper side; outside) of the display module 13 than the keyboard 76 and the first surface 66.

Next, the movement of the portable computer 11 when the configuration of the portable computer 11 is changed will be described with reference to FIGS. 20 and 21.

In the present embodiment, as in the state shown in FIG. 11 of the first embodiment, when the display screen 22A faces in (is opposed to) a direction of the main body 12, the portable computer 11 will be in a state in which the display module 13 overlaps with the main body 12, i.e., a portable configuration (a closed configuration in which the display module 13 is closed). When the display module 13 is rotated about the second axis 28, the portable computer 11 will be in a usual deployed configuration (an open configuration in which the display module 13 is open) of a notebook computer, as shown in FIG. 20. In the above-described states, the arm portion 14 is in a first position 21, where the second axis 28 of the display module 13 is positioned in the vicinity (neighborhood) of the first end portion 64 of the main body 12. As shown in FIG. 20, when the arm portion 14 is in the first position P1, one end portion 34 of the display module 13 fits in (interlocks with; engages with) the concave portion (concave surface; concave part) 71 and housed therein.

Figure 21:
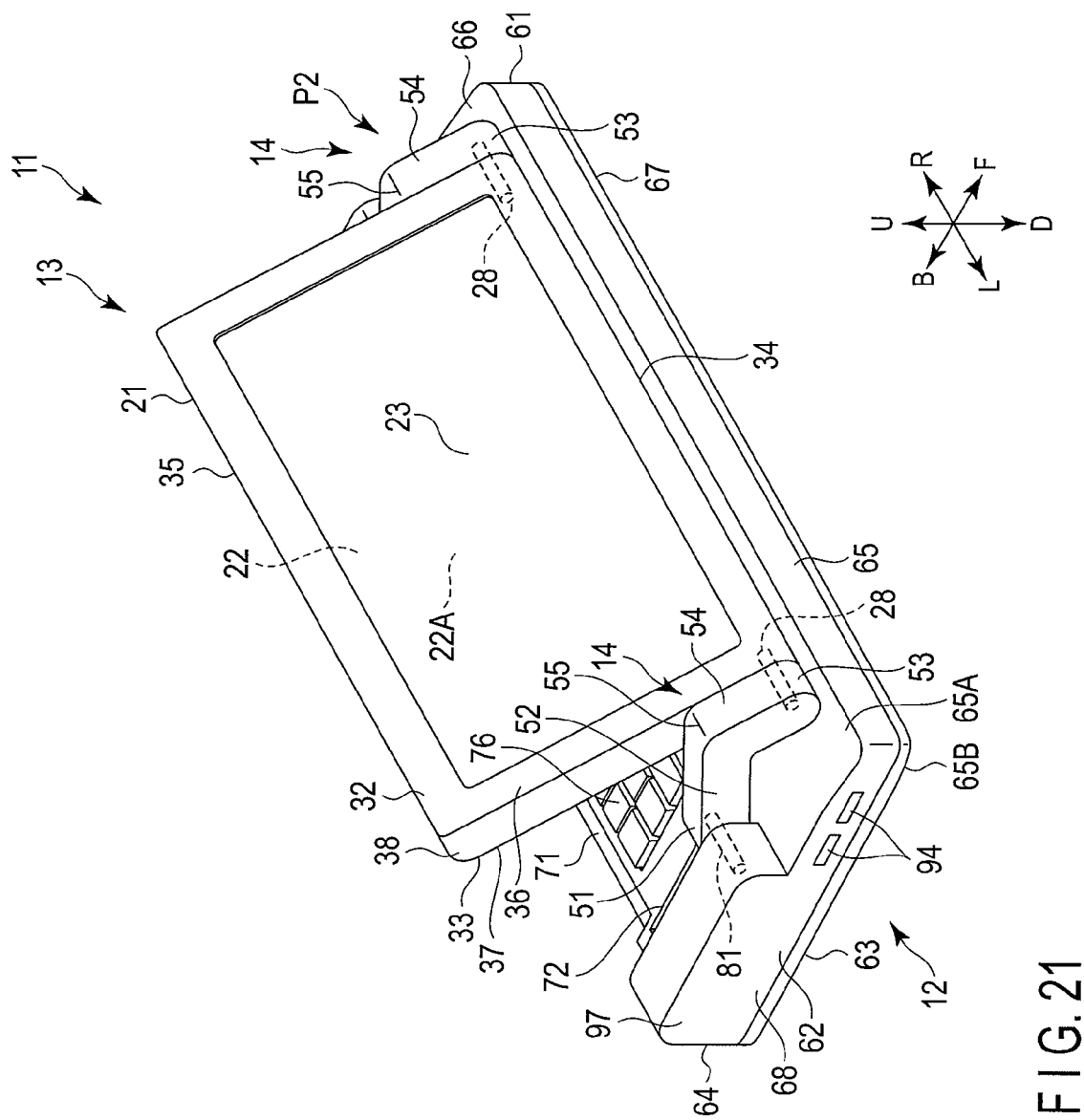
FIG. 21 is an exemplary perspective view illustrating a state in which the arm portion of the portable computer shown in FIG. 20 is in a second position.

From this state, when the arm portion 14 is rotated in the forward direction, as shown in FIG. 21, the second axis 28 of the display module 13 will be positioned in the vicinity (neighborhood) of (arranged adjacent to) the second end portion 65 of the main body 12. The position of the arm portion 14 in this state will be referred to as a second position P2. The configuration shown in FIG. 21 is a configuration designed for use on the desk, i.e., a tablet configuration (desk configuration) (first tablet configuration). When the display module 13 is further rotated about the second axis 28 from this state, as in the state shown in FIG. 15 according to the first embodiment, the portable computer 11 will be in a state in which the display screen 22A faces in a direction opposite to the main body 12 and the display module 13 overlaps with the main body 12, i.e., a tablet configuration in which the keyboard 76 is hidden (covered; housed) (second tablet configuration). In this tablet configuration, the second axis 28 of the display module 13 overlaps with the second end portion 65 (first slanting portion 65A) of the main body 12. Thereby, the dimensions (length and width) are prevented from increasing around the axis (second axis 28), where the dimensions in the thickness direction of the main body 12 and the dimensions in the thickness direction of the display module 13 tend to increase. When the arm portion 14 is in the second position P2, since the second connector (component) 94 is bypassed by (avoided by; apart from) the elbow portion 55, the arm portion 14 will not interfere with (abut; contact; obstruct) the second connector 94.

According to the third embodiment, since the component is bypassed by the elbow portion 55, when the arm portion 14 is positioned in the second position P2, the component and the arm portion 14 will not interfere with each other. It is thereby possible to secure space for providing the component and efficiently use the space inside the main body 12, and to make the portable computer 11 thinner and smaller by decreasing the thickness of the main body 12. Further, since the hollow portion 72 can house the arm portion 14 when the arm portion 14 is in the first position P1, the position of the arm portion 14 is stabilized and the display module 13 is prevented from wobbling when the arm portion 14 is in the first position P1.

The electronic apparatus is not limited to the portable computer 11 described in the above-described embodiments, and is applicable to other electronic apparatuses such as a portable telephone and a television, as a matter of course.

Further, the electronic apparatus is not limited to the configurations disclosed in the above-described embodiments, and may be embodied with modifications within the scope of the invention. Moreover, various inventions can be made by appropriately combining constituent elements disclosed in the embodiments. For example, some of the constituent elements may be deleted from all the constituent elements disclosed in the embodiments. Moreover, constituent elements disclosed in different embodiments may be combined as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
    a main body comprising a first housing and a pair of first axes, the first housing comprising a first end portion on a back side, a second end portion on a front side, and a pair of first side surfaces continuous with the first end portion and the second end portion, each of the first axes being at a midpoint in a longitudinal direction in the vicinity of one of the first side surfaces;
    a display comprising a second housing, a pair of second axes, and a screen, the second housing comprising a pair of second side surfaces and an end portion on a side closer to the main body, each of the second axes being in the vicinity of the end portion on the side closer to the main body in the vicinity of one of the second side surfaces;
    a pair of arm portions configured to couple the first axis and the second axis and comprising an elbow portion at a first point, each of the arm portions being rotatable about the first axis between a first position in which the second axis is in the vicinity of the first end portion and a second position in which the second axis is in the vicinity of the second end portion; and
    a component in the vicinity of the first side surface of the main body in a position bypassed by the elbow portion when the arm portion is in the second position,
    wherein the display is configured, when the arm portions are rotated to be in the first position, to rotate about the second axes selectively between a closed configuration and an open configuration, the closed configuration in which the screen is overlaid on the main body to face the main body, the open configuration in which the screen rises up from the first end portion of the main body, and the display is configured, when the arm portions are rotated to be in the second position, to rotate about the second axes selectively between a first tablet configuration and a second tablet configuration, the first tablet configuration in which the screen rises up from the second end portion of the main body, the second tablet configuration in which the screen is overlaid on the main body to face in a direction opposite to a direction of the main body.

2. The electronic apparatus of claim 1, wherein the arm portion in the second position is bent so as to be convex toward a direction opposite to the component.

3. The electronic apparatus of claim 1, wherein the main body comprises a hollow portion, and the hollow portion is depressed along the elbow portion and is capable of housing the arm portion when the arm portion is in the first position.

4. The electronic apparatus of claim 1, further comprising an applying portion configured to apply a first torque to the arm portion which is either in the first position or the second position in order to prevent the arm portion from rotating about the first axis.

5. The electronic apparatus of claim 1, wherein the second end portion has a thickness smaller than those of the other parts of the main body, and the second axis overlaps with the second end portion when the arm portion is in the second position.

6. The electronic apparatus of claim 1, wherein the main body comprises a concave portion configured to house the end portion of the display on the side closer to the main body when the arm portion is in the first position.

7. The electronic apparatus of claim 1, wherein the main body comprises:
a first surface which faces the display;
a keyboard on the first surface;
a second surface opposite to the first surface; and
a hollow portion in the main body in a position apart from the keyboard and capable of housing the arm portion which is in the first position,
wherein the first axis is in a position between the first surface and the second surface, and the display is closer to the back side than the keyboard when the arm portion is in the first position.

8. An electronic apparatus, comprising:
a main body comprising a first housing and a pair of first axes, the first housing comprising a first end portion on a back side, a second end portion on a front side, and a pair of first side surfaces continuous with the first end portion and the second end portion, the pair of first axes being at a midpoint in a longitudinal direction in the vicinity of the first side surface;
a display comprising a second housing, a pair of second axes, and a screen, the second housing comprising a pair of second side surfaces and an end portion on a side closer to the main body, the pair of second axes being in the vicinity of an end portion on the side closer to the main body in the vicinity of the second side surface;
a pair of arm portions, each of which is configured to couple the first axis and the second axis, comprising an elbow portion at a first point, and being rotatable about the first axis between a first position in which the second axis is in the vicinity of the first end portion and a second position in which the second axis is in the vicinity of the second end portion; and a component in the vicinity of the first side surface of the main body in a position bypassed by the elbow portion when the arm portion is in the first position, wherein the display is configured, when the arm portions are rotated to be in the first position, to rotate about the second axes selectively between a closed configuration and an open configuration, the closed configuration in which the screen is overlaid on the main body to face the main body, the open configuration in which the screen rises up from the first end portion of the main body, and the display is configured, when the arm portions are rotated to be in the second position, to rotate about the second axes selectively between a first tablet configuration and a second tablet configuration, the first tablet configuration in which the screen rises up from the second end portion of the main body, the second tablet configuration in which the screen is overlaid on the main body to face in a direction opposite to a direction of the main body.

9. The electronic apparatus of claim 8, wherein the arm portion in the first position is bent so as to be convex toward a direction opposite to the component.

10. The electronic apparatus of claim 8, wherein the main body comprises a hollow portion, and the hollow portion is depressed along the elbow portion and is capable of housing the arm portion when the arm portion is in the second position.

11. The electronic apparatus of claim 8, further comprising an applying portion configured to apply a first torque to the arm portion which is either in the first position or the second position in order to prevent the arm portion from rotating about the first axis.

12. The electronic apparatus of claim 8, wherein the second end portion has a thickness smaller than those of the other parts of the main body, and the second axis overlaps with the second end portion when the arm portion is in the second position.

13. The electronic apparatus of claim 8, wherein the main body comprises a concave portion configured to house the end portion of the display on the side closer to the main body when the arm portion is in the first position.

14. The electronic apparatus of claim 8, wherein the main body comprises:
a first surface which faces the display, a keyboard on the first surface; and
a second surface opposite to the first surface,
wherein the first axis is in a position between the first surface and the second surface, and the display is closer to the back side than the keyboard when the arm portion is in the first position.

15. An electronic apparatus, comprising:
a main body comprising a first axis at a midpoint in a longitudinal direction;
a display comprising a second axis and a screen, the second axis is in the vicinity of an end portion on a side closer to the main body;
an arm portion which couples the first axis and the second axis, comprises an elbow portion at a first point, and is rotatable about the first axis; and
a component is in the main body in a position bypassed by the elbow portion,
wherein the display is configured, when the arm portion is rotated to be in a first position, to rotate about the second axis selectively between a closed configuration and an open configuration, the closed configuration in which the screen is overlaid on the main body to face the main body, the open configuration in which the screen rises up from the first end portion of the main body, and the display is configured, when the arm portion is rotated to be in a second position, to rotate about the second axis selectively between a first tablet configuration and a second tablet configuration, the first tablet configuration in which the screen rises up from the second end portion of the main body, the second tablet configuration in which the screen is overlaid on the main body to face outward from the main body.

* * * * *